United States Patent
González Montiel et al.

(10) Patent No.: US 11,046,801 B2
(45) Date of Patent: Jun. 29, 2021

(54) GRAFTED POLYMERS

(71) Applicant: Rheomod de México, S.A.P.I. de C.V., Huixquilucan (MX)

(72) Inventors: Alfonso González Montiel, Atizapán de Zaragoza (MX); Leticia Flores Santos, Calimaya (MX); Maribel Pineda Herrera, Concepción (MX)

(73) Assignee: Rheomod de México, S.A.P.I. de C.V., Huixquilucan (MX)

( * ) Notice: Subject to any disclaimer, the term of this patent is extended or adjusted under 35 U.S.C. 154(b) by 57 days.

(21) Appl. No.: 16/308,491

(22) PCT Filed: Jun. 30, 2017

(86) PCT No.: PCT/IB2017/000961
§ 371 (c)(1),
(2) Date: Dec. 10, 2018

(87) PCT Pub. No.: WO2018/007869
PCT Pub. Date: Jan. 11, 2018

(65) Prior Publication Data
US 2019/0153140 A1   May 23, 2019

Related U.S. Application Data

(60) Provisional application No. 62/359,805, filed on Jul. 8, 2016, provisional application No. 62/357,976, filed on Jul. 2, 2016.

(51) Int. Cl.
*C08F 279/02* (2006.01)
*C08F 2/38* (2006.01)
(Continued)

(52) U.S. Cl.
CPC .............. *C08F 279/02* (2013.01); *C08F 2/38* (2013.01); *C08F 2/46* (2013.01); *C08F 212/08* (2013.01); *C08F 218/08* (2013.01); *C08F 220/14* (2013.01); *C08F 220/32* (2013.01); *C08F 257/02* (2013.01); *C08F 299/00* (2013.01); *C08L 23/12* (2013.01); *C08L 23/14* (2013.01); *C08L 51/003* (2013.01); *C08L 55/02* (2013.01);
(Continued)

(58) Field of Classification Search
CPC combination set(s) only.
See application file for complete search history.

(56) References Cited

U.S. PATENT DOCUMENTS

| | | |
|---|---|---|
| 4,746,714 A | 5/1988 | Spinelli et al. |
| 7,125,938 B2 | 10/2006 | Matyjaszewski et al. |

(Continued)

FOREIGN PATENT DOCUMENTS

WO    WO 2012/066016 A1    5/2012

*Primary Examiner* — Mark S Kaucher
(74) *Attorney, Agent, or Firm* — Stephen S. Hodgson

(57) ABSTRACT

A process is provided for grafting CRP synthesized polymers to dienes and polyolefins in the presence of a CRP controlling agent. Chain scission is minimal. Graft yield can be high and is proportional to the amount of CRP controlling agent added. The grafting process can be carried out either in a molten phase, preferably by reactive extrusion, or in a solvent-based process. The process provides novel families of grafted polyolefins and dienes, which show promising applications as new materials and as additives in the polymer industry.

31 Claims, 14 Drawing Sheets

GRAFTED POLYOLEFINS USING A CRP AGENT (IODINE)
(Examples 2.2 and 2.3)

(51) Int. Cl.
*C08F 257/02* (2006.01)
*C08L 67/02* (2006.01)
*C08L 23/12* (2006.01)
*C08F 212/08* (2006.01)
*C08L 51/00* (2006.01)
*C08L 23/14* (2006.01)
*C08L 55/02* (2006.01)
*C08L 67/04* (2006.01)
*C08F 299/00* (2006.01)
*C08F 2/46* (2006.01)
*C08F 218/08* (2006.01)
*C08F 220/14* (2006.01)
*C08F 220/32* (2006.01)
*C08K 3/40* (2006.01)
*C08K 3/26* (2006.01)
*C08K 3/34* (2006.01)
*C08K 7/14* (2006.01)

(52) U.S. Cl.
CPC ............... *C08L 67/02* (2013.01); *C08L 67/04* (2013.01); *C08F 220/325* (2020.02); *C08F 2438/01* (2013.01); *C08F 2438/02* (2013.01); *C08F 2438/03* (2013.01); *C08K 3/26* (2013.01); *C08K 3/34* (2013.01); *C08K 3/40* (2013.01); *C08K 7/14* (2013.01); *C08K 2003/265* (2013.01); *C08L 2205/16* (2013.01)

(56) References Cited

U.S. PATENT DOCUMENTS

| | | |
|---|---|---|
| 2004/0116610 A1* | 6/2004 | Torres ................ C08L 23/02 525/242 |
| 2007/0049696 A1* | 3/2007 | Gonzalez Montiel ................ C08F 269/00 525/242 |
| 2008/0319131 A1 | 12/2008 | McCullough et al. |
| 2010/0311849 A1* | 12/2010 | Gonzalez Montiel ................ C08G 63/91 521/48 |
| 2010/0311920 A1 | 12/2010 | González Montiel et al. |
| 2012/0266528 A1 | 10/2012 | Booth et al. |

* cited by examiner

GRAFTED POLYMERS

CROSS REFERENCE TO RELATED APPLICATIONS

This is a national stage application under 35 U.S.C. § 371 of International Application No. PCT/IB2017/000961, which is incorporated by reference. This application claims priority to and the benefit of U.S. Provisional Patent Application Ser. Nos. 62/357,976, filed on Jul. 2, 2016, and 62/359,805, filed on Jul. 8, 2016, each of which is incorporated by reference.

BACKGROUND OF THE INVENTION

1. Field of the Invention

The present invention relates to polyolefins and other polymers grafted with homopolymers or copolymers and the process for producing these grafted polymers. More specifically, the invention relates to methods for producing polymers grafted with polymers or copolymers made by controlled living radical polymerization techniques and the grafted products obtained from such methods.

2. Description of the Related Art

Polyolefin resins such as polypropylene and polyethylene are widely used by the industry for many different applications, e.g., automotive parts, packaging, sheets, films, and formed articles because they have many excellent properties such as formability, chemical resistance, water resistance, and electric characteristics. However, articles made from these polyolefin resins are non-polar, so adhesion to their surface is difficult in contrast to polar substrates formed of materials such as polyurethane, polyamide, acrylic, and polyester resins.

Several approaches have been evaluated to increase the polarity of polyolefins. Two approaches among these are particularly attractive for producing polyolefins with reactive sites that can subsequently be grafted by means of polar or reactive chemical compounds:

The first approach consists of producing a statistical olefinic copolymer using at least two monomers, one of which is olefinic, for example ethylene, and the other has a polar nature such as maleic anhydride or glycidyl methacrylate (GB 1,146,579 A and GB 1,352,088 A). This process is limited by the type and number of monomers that can be copolymerized with the olefinic monomers, in specific, only ethylene can be copolymerized with polar monomers. Commercial terpolymers of this nature such as Lotader® form Arkema and Elvaloy® from DuPont are widely used in extrusion coating and offer improved adhesion on many supports. These types of copolymers are used as coextrusion binders or tie layers in multilayer structures for the packing industry, pipeline coatings, cables and hotmelt adhesives. These terpolymers can also be used as impact modifiers for engineering polymers such as polyamides and polyesters The other method consists of modifying polyolefins by radical grafting of functional monomers (G. Moad, The synthesis of polyolefin graft copolymers by reactive extrusion, Prog. Polym. Sci. 24 (1999) 81-142). The grafting reaction allows the introduction into the polymeric chain of small quantities of polar groups, for example of maleic anhydride (see U.S. Pat. No. 4,950,541 and prior art mentioned within) or acid nature (contained, in general, in small percentages by weight), to impart new properties to the polymer without significantly varying its starting characteristics. This reactive transformation process is conducted in discontinuous mechanical mixers or in extruders, at a temperature, which makes it possible to maintain the reaction mixture in the molten state. The reactive mixture comprises, besides the polyolefin, at least one radical reaction initiator and at least one grafting compound. Usually, the initiator is a peroxide, and the grafting compound is an unsaturated polar compound, such as, for example, maleic anhydride, maleic esters, a maleic semiesters or a methacrylates. In the reaction mechanism the radical reaction initiator, a peroxide, decomposes into peroxide radicals (RO.) at high temperatures. The peroxide radicals can extract hydrogen from the polyolefin (P) and generate macroradicals (P.). The macroradicals (P.) of the polyolefin can give crosslinking products, degradation products or interact with grafting compounds to give other radicals (PM.). The grafted polyolefins (PMH) are generated when the macroradicals (PM.) of the grafted polyolefin become stable by extracting hydrogen from another molecule of polyolefin, which in turn becomes radical (P.).

However, because of the great reactivity and consequent low selectivity of the free radicals in their reactive activity, the grafting of the polyolefin occurring in the melt by radical means is accompanied by collateral reactions which can be attributed to the degradation reactions and to crosslinking reactions of the polyolefin. When these reactions occur, which compete with the grafting, the process therefore has a reduced overall efficiency and a final product with a low degree of grafting. Another consequence of the degradation and crosslinking reactions is the variation in the average molecular weight of the polyolefins. Other disadvantages include polyolefin molecular weight loss caused by beta-scission in the case of polypropylene grafting processes and the presence of side reactions such as homopolymerization of the monomers to be grafted, in the case of acrylic acid grafting over different polyolefins.

Modified polyolefins obtained through this process find different applications such as nanofiller coupling agents (CN 101759924), as polyolefins with improved mechanical properties (WO/2010/099645), as metal lubricating agents (JP 2001041247), as scratch resistant additives (US 20060276571), as hot melt adhesives (CN 1613887) as compatibilizers (US 20060135695), as metallizable copolymers (EP 1443063), antibacterial fibers (U.S. Pat. No. 6,596,657) and as wax dispersant agents (JP 2000305319). Polymers that have been functionalized (typically by maleic anhydride grafting) help bond together dissimilar polymers used in toughened, filled and blended compounds. Some commercial products based on this technology are Dow AMPLIFY™ GR, Addivant™ Polybond®, DuPont™ Fusabond® and Arkema™ Orevac®.

A variation of the reactive extrusion process has been explored by Nadia Torres and coworkers, and disclosed in patent application US 2004/0116610. In this case a polyolefin is functionalized using a reactive extrusion process in order to introduce functional sites such as anhydride or epoxy. In a second step, at least one mono-functional type oligomer with a predetermined chain length, with a very low polydispersity and a controlled structure is grafted on the functionalized polyolefin by means of reactive functions, this oligomer being formed from polymerizable monomer(s) and by an approach other than polycondensation.

A recently explored method for functionalizing polyolefins consists in the introduction of functional groups, which can be further transformed into controlled radical polymerization sites, through the introductions of groups such as trithiocarbonate (CN 102206307). In a second step, the functionalized polyolefin is reacted with a monomer, which polymerizes in a controlled fashion in order to form branches. Since controlled radical polymerization is tolerant to a wide variety of functional monomers, this process allows monomers such as N,N-dimethylaminoethyl methacrylate to be introduced in the branches. Chlorosulfonated polyethylene can be used as a macro initiator for the ATRP of styrene and methyl methacrylate. This led to the formation of styrene or methyl methacrylate grafts from the polyethylene backbone (U.S. Pat. No. 7,125,938). One disadvantage in this recently explored method is that an appropriate solvent (or monomer mixture) has to be selected in order to maintain in solution the functionalized polyolefin and growing polymer to favor a good control over molecular weight and polydispersity.

Another approach was explored by Gonzalez Montiel, et.al. in US Patent Application 20100311920 A1, in which a pseudo-living block copolymer is mixed with and/or reacted with a polymeric material in an extruder. However, this patent application does not show evidence of a grafting reaction between the block copolymer and the polymeric material.

It is evident from the art previously described that there are many chemical approaches to induce a polar character to polyolefins. However, these approaches have not fully addressed issues such as: the degradation mechanism suffered by the polyolefin during the grafting process (leading to low molecular weight of the polyolefin backbone and gel formation due to crosslinking) and low efficiency of grafting in the polyolefin that leads to increased residuals after the grafting process and low functionality incorporated in the polyolefin.

The present invention describes a novel approach that was unexpectedly found to minimize degradation during the grafting process of the polyolefin and yields a high efficiency of grafting.

SUMMARY OF THE INVENTION

A process for making graft copolymers is described and claimed, which comprises: a) polymerizing vinyl monomers using controlled radical polymerization chemistry to obtain pseudo-living polymers; and b) grafting the pseudo-living polymer chains to olefins or dienes in the presence of one or more CRP controlling agents to form a grafted polyolefin or diene, preferably by reactive co-extrusion or by using a solvent-based reaction.

A process to chain extend condensation polymers is described and claimed, which comprises mixing at least one random copolymer produced by CRP containing epoxy functional groups with at least one condensation polymer, and optionally, adding other polymers or additives such as impact modifiers. A process is described and claimed that provides a polyolefin composite, which comprises mixing at least one grafted polyolefin obtained using the process described herein with at least one filler and at least one polyolefin, and, optionally, with additional additives.

DETAILED DESCRIPTION OF EMBODIMENTS OF THE INVENTION

Figure 1:
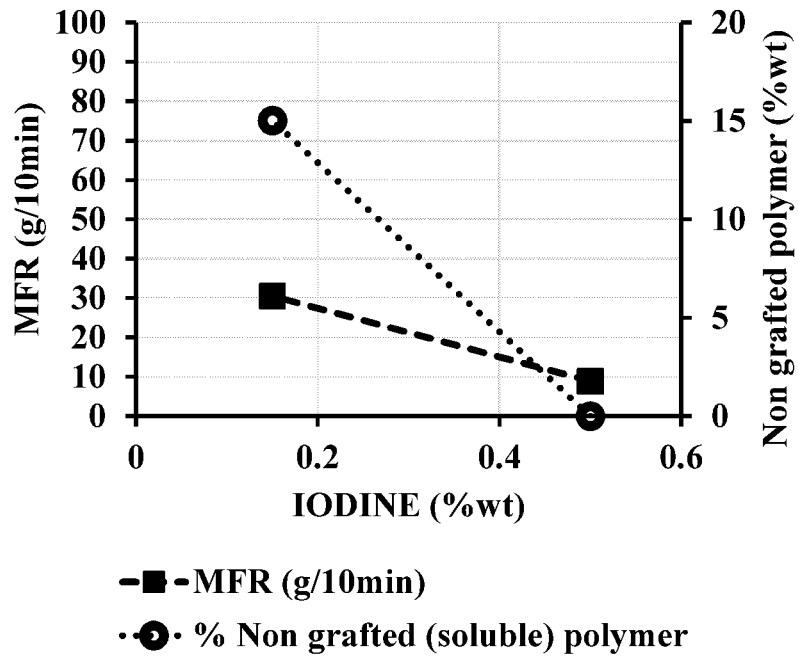
FIG. 1 shows grafting yield is increased as the amount of a CRP controlling agent is increased in a reactive extrusion process, according to the present invention.

The first step of this process includes a controlled free radical polymerization (CRP) process to obtain pseudo-living polymers or CRP synthesized polymers. A second step includes a graft reaction between the pseudo-living polymers and polyolefin or diene backbones. We have unexpectedly found that adding a CRP controlling agent to the grafting reaction improves the grafting process. In fact, we have discovered that the amount of a CRP synthesized polymer that is grafted to a polyolefine or to a diene backbone is proportional to the amount of the CRP controlling agent that is added. The synthesis of the grafted polyolefin or diene can be achieved either in the molten phase or in solution.

Controlled Free Radical Synthesized Polymers

In conventional radical polymerization processes, the polymerization terminates when reactive intermediates are destroyed or rendered inactive; radical generation is essentially irreversible. It is difficult to control the molecular weight and the polydispersity (molecular weight distribution) of polymers produced by conventional radical polymerization, and difficult to achieve a highly uniform and well-defined product. It is also often difficult to control radical polymerization processes with the degree of certainty necessary in specialized applications, such as in the preparation of end functional polymers, block copolymers, star (co)polymers, and other novel topologies.

In a controlled radical polymerization process, radicals are generated reversibly and irreversible chain transfer and chain termination are absent. Several different "Controlled", "living" or "pseudo-living" free radical polymerization processes (CRP), such as nitroxide-mediated living polymerization (NMLP) and derivatives thereof (like alcoxyamines, U.S. Pat. No. 6,455,706 B2; U.S. Pat. No. 5,401,804; EP 0 869 137 A1; U.S. Pat. Nos. 6,258,911 B1; 6,262,206 and 6,255,448 B1), atom transfer radical polymerization (ATRP), degenerative transfer (DT) or reversible addition-fragmentation transfer (RAFT) and reversible iodine transfer polymerization (RITP) polymerization have been tested and studied extensively. They differ from each other both in the form of the exchange reaction between active and dormant state and in the species used to trap the active chains. Since CRP processes generally provide compositionally homogeneous well-defined polymers (with predictable molecular weight, narrow molecular weight distribution, and high degree of chain end-functionalization) they have been the subject of much study. Progress in the different CRP procedures has been reported in several review articles (see prior art section of U.S. Pat. No. 8,445,610 B2; Wade A. Braunecker, Krzysztof Matyjaszewski, Controlled/living radical polymerization: Features, developments, and perspectives, Prog. Polym. Sci. 32 (2007) 93-146; Masami Kamigaito, Tsuyoshi Ando, and Mitsuo Sawamoto, Metal-Catalyzed Living Radical Polymerization, Chem. Rev. 2001, 101, 3689-3745.

In a radical polymerization, all polymer chains are eventually terminated, whereas in CRP the terminated chains constitute only a small fraction of all chains (~1 to 10%) while most polymer chains are in the dormant state. Most polymer chains in a CRP in the dormant state are capable of reactivation which allows continuation of the polymerization, functionalization, chain extension to form block copolymers, etc. Thus, a CRP behaves as a "living" polymerization process. [Greszta, D. et.al. *Macromolecules* 1994, 27, 638.]

CRP polymerizations have been reported to proceed at temperatures between 50 to 120° C., depending on the controlling agent. Living polymerizations can be performed in bulk, solution (McCormick et al. U.S. Pat. Nos. 6,855,840 B2, 7,179,872 B2, 7,402,690 and 6,855,840), emulsion, mini-emulsion (Butté, Alessandro, EP 1 205 492 A1) and in other systems such as the ones mentioned in U.S. Pat. No. 8,815, 971.

Besides the controlling agent, an initiator is typically required to prepare controlled free radical synthesized polymers. These include for RAFT, RITP, ARGET/ICAR ATRP (U.S. Pat. No. 8,815,971) and NMLP thermal or photo initiators (U.S. Pat. No. 6,911,510). Thermal initiators include but are not limited to: azo, peroxide, persulfate, and redox initiators. The initiators can be used in molar ratios from about 0.001:1 to 1:1, preferably 0.001:1 to 0.1:1 relative to CRP agent. If desired, the initiator may be added in bulk, may be added intermittently, or may be continuously added. In the case of ATRP, alkyl (pseudo) halides act as initiating species that are activated in the presence of transition metal complex activators (U.S. Pat. No. 7,893,173)

A wide variety of monomers that can be polymerized using CRP methods for the object of this invention, these include but are not limited to the ones mentioned in patents U.S. Pat. Nos. 7,179,872, 6,855,840, 5,763,548, 7,893,173, 8,445,610. Particularly useful monomers are acrylic monomers, especially including those with the structure:

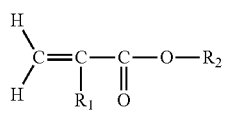

where R1 is hydrogen, phenyl or an alkyl radical which is linear or branched and has from 1 to 10 carbon atoms and R2 is an alkyl radical which has from 1 to 14 carbon atoms, may contain a tertiary amine or an ether linkage, and may be a cyclic hydrocarbon. More specifically, preferred monomers include acrylic monomers of the formula described above such as alkyl methacrylates or derivatives of alkyl methacrylates, such as hydrolyzed alkyl methacrylates, or anhydride derivatives and glycidyl methacrylate. Other suitable acrylic monomers include acrylates, such as tert butyl acrylate, cyclic alkyl methacrylates, such as 2, 5-dimethyl cyclohexyl methacrylate, and acrylates in which the alkyl group contains and ether linkage, such as tetrahydrofuran acrylate.

Styrenic monomers also useful as co-monomers in this invention include but are not limited to styrene, methylstyrene, chloromethylstyrene, (sulfonic acid) styrene, and the like.

Other monomers that can be successfully polymerized using CRP include, but are not limited to meth(acrylamides), acrylonitrile, 4-vinyl pyridine, dimethylaminoethyl methacrylate, hydroxyethyl acrylate, hydroxyethyl methacrylate, glycidyl acrylate, N-phenyl maleimide, N-cyclohexyl maleimide, maleic anhydride.

Considering the variety of monomers that can be polymerized using CRP, there is consequently a wide variety of copolymers that can be obtained by combining two or more different monomers yielding different structures such as linear gradient, linear block, tri- and multi-arm star copolymers.

Polymers and copolymers of the present invention have by themselves a number of possible applications, which include but are not limited to compatibilizers, chain extenders and coupling agents.

In the present invention, one or more of the above described monomers are polymerized using a CRP agent and an initiator using procedures known to one skilled in this art. In one embodiment, a polymer synthesized using CRP contains monomers selected from the group consisting of styrenic monomers, methacrylic monomers, acrylic monomers, anhydride containing monomers, amine containing monomers, amide containing monomers, epoxy containing monomers, hydroxyl containing monomers, acid containing monomers, sulfonate containing monomers, sulfate containing monomers, phosphate containing monomers, phosphonate containing monomer and anhydride containing monomers.

Preferred monomers in the present invention include styrene, alpha methyl styrene, butyl methacrylate, methyl methacrylate, hydroxyethyl methacrylate and glycidyl methacrylate.

In a specific embodiment, a copolymer containing from 1 to 60% wt methyl methacrylate, from 1 to 90% wt of styrene and from 0 to 50% wt of glycidyl methacrylate is synthesized using CRP. In a specific embodiment, a copolymer is obtained using a bulk polymerization process using CRP.

In one embodiment, a polymer synthesized using CRP has a molecular weight in number from 3,000 g/mole to 250,000 g/mole, preferably between 5,000 g/mole to 150,000 g/mole and most preferably between 10,000 g/mole to 100,000 g/mole.

Embodiments of the invention include the following materials obtained using RITP: a random copolymer of styrene and methyl methacrylate; a random copolymer of styrene and glycidyl methacrylate; a random copolymer of styrene, methyl methacrylate and glycidyl methacrylate; a random copolymer of styrene, hydroxyethyl methacrylate and methyl methacrylate; a random copolymer containing at least 50% wt styrene; a random copolymer containing 5 to 40% wt glycidyl methacrylate; a random copolymer containing 1 to 50% wt methyl methacrylate; and a random copolymer containing 1 to 10% wt hydroxyethyl methacrylate. In another specific embodiment, a random copolymer is obtained using a bulk polymerization process using RITP.

Polyolefins

The polyolefins to be grafted are obtained by polymerizing one or more known alpha-olefins. These polymers can be selected from the group consisting of polyethylene, polypropylene and ethylene copolymers such as ethylene-propylene copolymers, ethylene-butene copolymers, ethylene-octene copolymers, ethylene-vinyl acetate copolymers, propylene copolymers such as propylene-butene, propylene-hexene, propylene-octene and terpolymers such as polypropylene/ethylene-octene and ethylene propylene diene monomer, where the diene monomer can be selected from dicyclopentadiene (DCPD), ethylidene norbornene (ENB), and vinyl norbornene (VNB). These polymers and copolymers are normally solid, high molecular weight polymers prepared using a coordination type catalyst in a process wherein the alpha-olefin monomers are polymerized. The polymers may have a density in the range of about 0.82 g/cc to about 0.965 g/cc. It is evident to practitioners of the relevant arts that the density will depend, in large part, on the particular alkene(s) used as comonomer(s) and on the amount of the alkene(s) incorporated into the copolymer.

In general, the polyolefins employed in the practice of this invention have a melt flow index in the range from about 0.7 to about 1500. Preferably in the range of 1 to 50 and more preferably in the range of 5 to 20.

Specifically, suitable polypropylene backbones include: (a) a homopolymer of propylene; (b) a random copolymer of propylene and an olefin selected from the group consisting of ethylene and $C_4$-$C_{10}$ olefins, provided that when the olefin is ethylene, the polymerized ethylene content is up to about 10 weight percent, preferably up to about 4 weight percent, and when the olefin is a $C_4$-$C_{10}$ olefin, the polymerized content of the $C_4$-$C_{10}$ olefin is up to about 20 weight percent, preferably up to about 16 weight percent; (c) a random terpolymer of propylene and at least two olefins selected from the group consisting of ethylene and $C_4$-$C_{10}$ alpha-olefins, provided that the polymerized $C_4$-$C_{10}$ alpha-olefin content is up to about 20 weight percent, preferably up to about 16 weight percent, and, when ethylene is one of the olefins, the polymerized ethylene content is up to about 5 weight percent preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$-$C_{10}$ olefins include the linear and branched $C_4$-$C_{10}$ alpha-olefins such as, for example, 1-butene, 1-pentene, 3-methyl-1-butene, 4-methyl-1-pentene, I-hexene, 3,4-dimethyl-1-butene, I-heptene, 1-octene, 3-methyl-hexene, and the like. Propylene homopolymers and impact-modified propylene homopolymers are preferred propylene polymer materials. Propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

Grafting Process

An unexpected result disclosed in the present patent application is the reaction between CRP synthesized polymers and polyolefins in the presence of additional CRP agents. In contrast with traditional peroxides used in grafting processes, the addition of CRP agents does not produce chain scission and allows for controlled amounts of grafted CRP synthesized polymers over polyolefins according to the amount of added CRP agent. This process provides also good grafting results using dienes instead of polyolefins and can be carried on either in a molten phase process or in a solvent based process.

The process conditions of the grafting reaction for obtaining the grafted polyolefins of the present invention are described next.

Grafting may be affected in the presence of oxygen, air, other controlled free radical controlling agents, or in the essential absence of these materials. A convenient method for producing the graft copolymer is the use of extrusion machinery; however, batch mixers (i.e. Brabender mixers or Banbury mixers and the like) may also be used for forming the graft copolymers. A preferred type of extruder is an electrically heated co-rotating fully intermeshing twin-screw extruder.

In a preferred embodiment, one or more controlled free radical polymerized polymers are mixed and reacted with one or more polyolefins in the presence of one or more additional CRP agents, at molten temperatures in an extruder, thereby producing a grafted polymer.

The preferred process temperature is from 100° C. to 280° C., preferably from 150-280° C. and more preferably between 200° C. and 250° C. Although most CRP synthesized polymers are active above 100° C., we have unexpectedly found that grafting processes are preferably conducted above 150° C., more preferably above 200° C. This temperature range is unexpected for these grafting reactions, since it corresponds with a temperature range where the mechanisms for the pseudo living CRP polymers begin to fail by side reactions, such as catalyst decomposition, among others (Vivek Mishra and Rajesh Kumar, Journal of Scientific Research Banaras Hindu University, Varanasi, Vol. 56, 2012: 141-176).

In a preferred embodiment, a controlled free radical polymerized polymer is mixed and reacted with a polyolefin in the presence of one or more CRP agents, where the CRP synthesized polymer to polyolefin ratio is between 98:1 to 1:98 weight ratio, preferably between 60:50 to 10:90 and most preferably between 50:50 to 15:85.

In a preferred embodiment, a controlled free radical polymerized polymer is mixed and reacted with a polyolefin in the presence of one or more CRP agents, where the polyolefin is selected from the group consisting of polyethylene, polypropylene and ethylene copolymers such as ethylene-propylene copolymers, ethylene-butene copolymers, ethylene-octene copolymers, ethylene-vinyl acetate copolymers, propylene copolymers such as propylene-butene, propylene-hexene, propylene-octene and terpolymers such as polypropylene/ethylene-octene.

In a preferred embodiment, one or more controlled free radical polymerized polymers are mixed and reacted with one or more polyolefins in the presence of an additional CRP agent, where the additional CRP agent is added from 0.005 to 5.00% wt, preferably between 0.01 to 3% wt and most preferably between 0.015 to 2.5% wt.

In a preferred embodiment, one or more controlled free radical polymerized polymers are mixed and reacted with the polyolefin in the presence of an additional CRP agent, where the additional CRP agent is selected from the group consisting of iodine, RAFT agents, nitroxides, alkoxyamines, aryl halides, alkyl halides.

In one embodiment, a controlled free radical polymerized polymer is mixed and reacted with a polyolefin in the presence of one or more additional CRP agents, where the CRP synthesized polymer contains monomers selected from the group consisting of styrenic monomers, methacrylic monomers, acrylic monomers, anhydride containing monomers, amine containing monomers, amide containing monomers, epoxy containing monomers, hydroxyl containing monomers, acid containing monomers, sulfonate containing monomers, sulfate containing monomers, phosphate containing monomers, phosphonate containing monomer and anhydride containing monomers.

In one embodiment, a controlled free radical polymerized polymer is mixed and reacted with a polyolefin in the presence of one or more additional CRP agents, where the CRP synthesized polymer has a molecular weight in number from 3,000 g/mole to 200,000 g/mole, preferably between 10,000 g/mole to 120,000 g/mole and most preferably between 15,000 g/mole to 80,000 g/mole.

In one embodiment, a controlled free radical polymerized polymer is mixed and reacted with a polyolefin in the presence of one or more additional CRP agents, where the CRP synthesized polymer is synthesized using a CRP technique selected from the group consisting of RAFT, RITP, ARGET/ICAR ATRP and NMLP.

We have also found that a grafting process also occurs when a diene is used instead of a polyolefin and the grafting process takes places in a stirred reactor, using solvent to dissolve the CRP synthesized polymer, the diene and the additional CRP agent. In this case, a convenient method for producing the graft copolymer is the use of a glass or stainless steel stirred reactor or a similar system provided with heating and stirring.

In one embodiment, one or more controlled free radical polymerized polymers are mixed and reacted with one or more dienes and one or more CRP agents, using a suitable solvent or solvents, that can include monomer or monomers in addition or in substitution of a solvent.

The preferred process temperature is from 50° C. to 280° C., preferably from 60 to 220° C. and more preferably between 70° C. and 150° C. In contrast to melt extrusion process, where temperatures must be higher than the glass transition temperature of each polymer, in the case of a solution based process, we have found that the reaction can take place at temperatures as low as 50° C.

In one embodiment, a free radical polymerized polymer is mixed and reacted with a diene and a CRP agent, where the diene is selected from the group consisting of any diene rubber or mixture of diene rubbers, i.e., any rubbery polymer (a polymer having a second order transition temperature not higher than 0° C., preferably not higher than −20 C., as determined by ASTM test D-746-52T) of one or more conjugated 1,3-dienes, e.g., butadiene, isoprene, piperylene, chloroprene, etc. Such rubbers include homopolymers of conjugated 1,3-dienes, interpolymers of conjugated 1,3-dienes with one another, and interpolymers of one or more conjugated 1,3-dienes, isomeric forms such as high cis, low cis, high vinyl, high trans, diene copolymers such as ABS, and butadiene-styrene copolymers.

In one embodiment, one or more controlled free radical polymerized polymers are mixed and reacted with one or more dienes and a CRP agent, where the CRP agent is added between 0.005 to 5.00% wt, preferably between 0.01 and 3% wt and most preferably between 0.15 and 2.5% wt.

In a preferred embodiment, a controlled free radical polymerized polymer is mixed and reacted with a diene in the presence of one or more additional CRP agents, where the CRP synthesized polymer to diene ratio is between 98:1 to 1:98 weight ratio, preferably between 60:50 to 10:90 and most preferably between 50:50 to 15:85.

In one embodiment, a controlled free radical polymerized polymer is mixed and reacted with a diene in the presence of one or more additional CRP agents, where the CRP synthesized polymer contains monomers selected from the group consisting of styrenic monomers, methacrylic monomers, acrylic monomers, anhydride containing monomers, amine containing monomers, amide containing monomers, epoxy containing monomers, hydroxyl containing monomers, acid containing monomers, sulfonate containing monomers, sulfate containing monomers, phosphate containing monomers, phosphonate containing monomer and anhydride containing monomers.

In one embodiment, a controlled free radical polymerized polymer is mixed and reacted with a diene in the presence of one or more additional CRP agents, where the CRP synthesized polymer has a molecular weight in number from 3,000 g/mole to 200,000 g/mole, preferably between 10,000 g/mole to 120,000 g/mole and most preferably between 15,000 g/mole to 80,000 g/mole.

In one embodiment, a controlled free radical polymerized polymer is mixed and reacted with a diene in the presence of one or more additional CRP agents, where the CRP synthesized polymer is synthesized using a CRP technique selected from the group consisting of RAFT, RITP, ARGET/ICAR ATRP and NMLP.

Use of the Grafted Polyolefins and Dienes

The uses of the grafted polyolefins and dienes described in the present invention are expected to be similar to the ones explored in other grafted polyolefins and dienes by means of traditional procedures such as reactive extrusion and copolymerization. The applications include but are not limited to: co extrusion binders or tie layers in multilayer structures for the packing industry, pipeline coatings, cables and hot melt adhesives, impact modifiers, compatibilizers, surface modifiers and coupling agents. Additives for improved metal adhesion, fillers and nanofillers coupling agents, metal lubricating agents, scratch resistant additives, metallizable copolymers, antibacterial fibers, wax dispersant agents Chain Extension During the development and optimization of the CRP synthesized copolymers to be grafted to the polyolefins and dienes we found a specific application of styrene-glycidylmethacrylate random copolymers of molecular weight in number, higher than 10,000 which show efficient polyester chain extension reactions.

In contrast to reported oligomeric epoxy containing materials (William George Blasius, J.; Gary A. Deeter; Villalobos, M. A.; USPTO, Ed.; Johnson Polymer, LLC: US, 2006; Vol. U.S. Pat. No. 6,984,694 B2; Villalobos, M.; Awojulu, A.; Greeley, T.; Turco, G.; Deeter, G. Energy 2006, 31, 3227-3234) and to block copolymers that need to be prepared in a multi-step process (Alfonso Gonzalez Montiel; Santos, L. F.; Hernández, P. E.; US2010/0311920), these random copolymers can be synthesized in a single step and, due to their non-oligomeric nature, can be easily granulated in particles of size similar to commercially available polyester pellets which allow direct addition to typical polymeric extrusion and injection processes.

In one embodiment, a CRP synthesized random copolymer of glycidyl methacrylate and styrene with Mn from 10,000 g/mole to 120,000 g/mole is used as polyester chain extender.

In a preferred embodiment, a CRP synthesized random copolymer of glycidyl methacrylate and styrene with Mn from 15,000 g/mole to 80,000 g/mole is used as polyester chain extender.

In a preferred embodiment, a CRP synthesized random copolymer containing from 5 to 50% wt of glycidyl methacrylate and styrene with Mn from 15,000 g/mole to 80,000 g/mole is used as polyester chain extender.

EXAMPLES

A. Preparation of pseudo living polymers, "CRP synthesized polymers"

Random copolymers were prepared by a batch polymerization process at 70 or 80° C., depending on the composition, during 4.5-5 h, according to table 1. The initiator, controlling agent and monomers, used as received, were stirred for 20 minutes until the controlling agent is dissolved. The reaction mixture is heated until a temperature of 60° C. is reached; at this moment, the initiator is slowly added and the polymerization is initiated. Temperature is increased, to reach the temperature indicated in Table 1, and the reaction is continued until a conversion of about 40-50% is reached. The reaction is cooled down and the resulting product is transferred to glass or Teflon coated metallic molds. In a second stage, the molds are heated to 120° C. for approximately 15 h or until 99.9% conversion is reached. The resulting polymer is released from the molds and ground to obtain a solid granulated clear material with the molecular weights in number, Mn, and polydispersities, PD, shown in TABLE 1.

GPC (ASTM D3536-91) was performed using an HPLC (Agilent 1100), RI detector, THF eluent, 1.0 mL/min, at 40° C. and two AM Gel columns 10000 A and 1000 A.

TABLE 1

Copolymers synthesized using CRP.

| No. | Styrene (kg) | Glycidyl Methacrylate (kg) | Methyl methacrylate (kg) | Total monomers (Kg) | Iodine (Kg) | AIBN (Kg) | Temp. (° C.) | Mn (g/mole) | PD |
|---|---|---|---|---|---|---|---|---|---|
| 1.1 | 85 | 15 | 0 | 100 | 0.42 | 0.274 | 80 | 29,329 | 1.6 |
| 1.2 | 80 | 20 | 0 | 100 | 0.42 | 0.274 | 80 | 34,494 | 1.6 |
| 1.3 | 70 | 30 | 0 | 100 | 0.42 | 0.274 | 70 | 34,180 | 1.75 |
| 1.4 | 51 | 15 | 34 | 100 | 0.42 | 0.192 | 80 | 51,837 | 1.8 |
| 1.5 | 57 | 5 | 38 | 100 | 0.42 | 0.192 | 80 | 42,880 | 1.79 |
| 1.6 | 42 | 30 | 28 | 100 | 0.42 | 0.192 | 70 | 79,369 | 2.1 |
| 1.7 | 40 | 0 | 60 | 100 | 0.42 | 0.192 | 70 | 41,410 | 1.94 |

The synthesis using RITP (reversible iodine transfer polymerization) is preferred over other CRP polymerizing techniques because the reaction can be achieved at relatively low temperatures (55° C. to 60° C.) and the reagent is not as expensive and specialized as in the case of alkoxyamines, nitroxides, ATRP and RAFT agents which are the other typically used CRP agents.

Examples shown in table 1 explore the synthesis of styrene-glycidyl methacrylate-methyl methacrylate copolymers including different ratios of each monomer. Styrene is included in all cases because, according to our experience, it allows a good control, in terms of reaction rate and polydispersity of the final copolymer. Glycidyl methacrylate is the functional monomer that, according to our experience, provides a good reactivity towards functional polymers and fillers because the oxirane or epoxy moiety is a very reactive group, as has been well documented in the literature. The amount of glycidyl methacrylate can be increased up to 45-50% wt in the formulation, according to our experience, but for the applications explored in this patent application, the reactivity would be extremely high and undesirable side effects (such as extremely high viscosities during chain extension that can damage processing equipment) can be found. For this reason, examples from table 1 show only copolymers that showed good performance in terms of reactivity. Finally, methyl methacrylate is included in the formulations to modify the polarity of copolymers using a widely available and economic monomer.

In terms of molecular weight, we decided to synthesize copolymers in the range of Mn (Molecular weight in number) 25,000-100,000 g/mole. The reason being that low molecular weight copolymers or oligomers have low melt viscosity, and blending them with other polymers, either for grafting purposes or for other applications, is very difficult due to rheological problems, which cause segregation and poor interaction between materials. On the other side, high molecular weights would require more reaction time in the synthesis of the random copolymers and in some cases control over polydispersity is lost.

A CRP synthesized polymer preferably contains monomers that contain one or more functional groups such as epoxy, hydroxyl, anhydride, amine, amide, carboxylic acid and carboxylate functional groups. A CRP synthesized polymer preferably contains monomers of styrene, methyl methacrylate, and glycidyl methacrylate. Preferred CRP controlling agents include iodine, RAFT, nitroxide and alkoxyamine. In a specific embodiment, a styrene acrylic copolymer is synthesized using a technique selected from the group consisting of RAFT, RITP, ARGET/ICAR ATRP and NMLP. A molecular weight in number of a CRP copolymer is preferably higher than 10,000 g/mole and preferably lower than 120,000 g/mole in one embodiment and is typically between 10,000 and 120,000. A CRP synthesized polymer preferably contains 1-80% wt styrene, 1-50% wt glycidyl methacrylate and 1-50% wt methyl methacrylate in one embodiment.

Generally, a process for making a CRP synthesized polymer or copolymer comprises mixing a CRP controlling agent and monomers, particularly styrene, methyl methacrylate and glycidyl methacrylate monomers, and preferably also monomers listed elsewhere in this application, for a period of time, typically for less than an hour, preferably for less than 30 minutes and more preferably about 15-25 minutes, preferably until the CRP controlling agent is dissolved, thereby making a reaction mixture; heating the reaction mixture, typically to 30-120° C., preferably 35-100, more preferably 40-80, with 50-70 or about 60° C. being the most preferred; adding an initiator, preferably slowly, heating the reaction mixture more after the initiator is added typically to 50-100° C., preferably to 60-90 and more preferably to 65-85 with 70-80° C. being most preferred; reaching a conversion of typically between 20 and 80%, preferably 30-70 or 35-65% and most preferably 38-55% conversion, thereby forming a first-stage reaction product; cooling the first-stage reaction product down; transferring the first-stage reaction product to a reactor or to molds for a second-stage reaction; heating the reactor or molds to a temperature of typically between 80 and 160° C., preferably between 100 and 140, more preferably between 110 and 130 with a temperature of between 115 and 125 or about 120° C. being most preferred; reaching a conversion of typically over 90% in the second-stage reaction, preferably over 95% and more preferably over 98 or 99% conversion, thereby making the CRP synthesized polymer, wherein the polymer is preferably a solid and preferably a clear and solid material; removing the polymer from the reactor or molds; preferably grinding the CRP synthesized polymer; and preferably obtaining a solid, granular material, wherein the CRP synthesized polymer preferably has a number average molecular weight of typically between 10,000 and 150,000, preferably between 15,000 and 140,000 and more preferably between 20,000 and 130,000 with a range of 28,000 to 85,000 being most preferred, with actual results ranging between 29,000 and 80,000, and wherein the CRP synthesized polymer preferably has a polydispersity of typically between 1 and 3, preferably between 1.3 and 2.5, more preferably between 1.4 and 2.3 and most preferably between 1.5 and 2.2, with actual results in the range of 1.6 to 2.1. This process produces a CRP synthesized polymer or copolymer and is a first step in a two-step procedure, according to the present invention. A second step in the two-step procedure is grafting the CRP synthesized polymer or copolymer to a polyolefin or another suitable polymer or copolymer such as a diene polymer or copolymer or a polyester, which is described below.

B. Synthesis of Grafted Polyolefins by Means of Reactive Extrusion

GRAFTING OVER A PROPYLENE ETHYLENE COPOLYMER. Copolymer from example 1.2, copolymer from example 1.4, and a commercially available propylene ethylene copolymer (Versify 3000 from DOW, MFR of 8 g/10 min according to ASTM D-1238 230° C., 2.16 Kg) and different amounts of different CRP controlling agents were blended in a Xinda PSHJ-20 co-rotating twin-screw extruder with a temperature profile of (° C.): 60, 190, 250, 230, 200, 190.

The specific CRP agents were: the RAFT agent S-(Thiobenzoyl) thioglycolic acid (acquired from Sigma Aldrich), the nitroxide TEMPO (acquired from Sigma Aldrich) and the Alcoxiamine, Irgatec CR 76 (acquired from Ciba Specialty Chemicals). As a reference, the bifunctional peroxide Trigonox 101 was also evaluated. The proportions introduced to the extruder are shown in Table 2.

The MFR of the resulting copolymers was determined according to ASTM D-1238 (230° C., 2.16 Kg). The amount of grafted copolymer was analyzed by an internally developed procedure that considers the fact that styrene-acrylic copolymers are very soluble in tetrahydrofuran, whereas polyolefins are very insoluble in this solvent. In this procedure 6 g of the resulting blend, after reactive extrusion, is weighed and introduced into the thimble of a soxhlet extractor. Solvent extraction is performed for 7 h using 100 mL of tetrahydrofuran at boiling temperature (which is condensed in the condenser and refluxed during this period). After extraction, the solvent is removed, yielding the extracted compound. The non-soluble portion of the sample remains in the thimble In all cases, the amount of extractable material of the neat polyolefin is quantified, since commercially available polyolefins typically contain small amounts of low molecular weight additives, such as antioxidants and lubricants. The amount of extractable material of the neat polyolefin is considered and subtracted from the amount of extractable material obtained in the blend, and this amount is reported as "Non-grafted polymer" in TABLE 2.

TABLE 2

GRAFTED POLYOLEFINS USING VERSIFY AS POLYOLEFIN

| No. | Copolymer from example/ (% wt) | Versify 3000 (% wt) | CRP Agent | CRP Agent (% wt) | Other, (% wt) | MFR* | Non-grafted polymer (% wt) | Grafting yield (%) |
|---|---|---|---|---|---|---|---|---|
| 2.1 | Example 1.2/ 30% wt | 70.00 | None | 0 | — | 6.56 | 31.28 | 0 |
| 2.2 | Example 1.2/ 30% wt | 69.50 | Iodine | 0.5 | — | 8.96 | 0 | 100 |
| 2.3 | Example 1.2/ 30% wt | 69.85 | Iodine | 0.15 | — | 30.56 | 15.03 | 50 |
| 2.4 | Example 1.2/ 30% wt | 69.85 | RAFT | 0.15 | — | 27.12 | 0 | 100 |
| 2.5 | Example 1.2/ 30% wt | 69.85 | Nitroxide | 0.15 | — | 18.36 | 13.01 | 57 |
| 2.6 | Example 1.2/ 30% wt | 69.75 | Alkoxyamine | 0.25 | — | 20.64 | 15.53 | 48 |
| 2.7 | Example 1.2/ 30% wt | 69.75 | None | 0 | Peroxide, 0.25 | 49.44 | 2.58 | 91 |
| 2.8 | Example 1.2/ 30% wt | 69.50 | None | 0 | Peroxide, 0.50 | 93.12 | 2.66 | 91 |
| 2.9 | Example 1.4/ 30% wt | 69.5 | Alkoxiamine | 0.5 | — | 10.3 | 7.42 | 75 |
| 2.10 | Example 1.4/ 30% wt | 68.5 | Alkoxiamine | 1.5 | — | 12.3 | 0.99 | 97 |

*g/10 min, according to ASTM D-1238 (230° C., 2.16 Kg).

As example 2.1 from TABLE 2 shows, when Versify is blended with copolymer from example 1.2 in a 70/30 ratio using a twin-screw extruder, without a CRP controlling agent, essentially no grafted copolymer is obtained, since the amount of extracted material equals the amount of added styrene acrylic copolymer from example 1.2 contained in the blend (30% extracted out of 30% added styrene acrylic copolymer). As explained before, the polyolefin is not soluble in tetrahydrofuran. The grafting yield of this example is zero, so no reaction is taking place.

In contrast to example 2.1, example 2.2 shows that when Versify is blended with copolymer from example 1.2 in a 70/30 ratio using a twin-screw extruder, with a CRP controlling agent, in this case 0.5% wt iodine, during the extrusion process, essentially all the copolymer from example 1.2 is grafted to Versify. In this case the amount of extracted material is zero and the grafting yield 100%. The fact that this new material is no longer soluble in THF can easily be explained considering two factors. The first one is that a covalent bond between copolymer from example 1.2 and Versify is formed, and the molecular weight of this new polymer is higher than the molecular weight of Versify making it less soluble (higher molecular weight polymers have less solubility, in general, than low molecular weight polymers). The second one is that the amount of polyolefin is higher than the amount of styrene-acrylic copolymer, so the solubility would be similar to the one observed in the polyolefin, which is not soluble in tetrahydrofuran.

Example 2.3 from TABLE 2, shows the same blend discussed in examples 2.1 and 2.2 (70/30 versify/copolymer from example 1.2), but in this case a smaller amount of iodine (as CRP agent used during extrusion) was added (0.15% wt instead of 0.5% wt form example 2.2). In this case, 15.03% of the resulting blend, after extrusion, can be extracted with tetrahydrofuran, which means that the grafting process occurred only with a 50% yield. The example shows that the amount of grafted living styrene acrylic copolymer in the polyolefin is proportional and related to the amount of CRP agent added during the reactive extrusion process.

Example 2.4 from TABLE 2, shows the same blend discussed in examples 2.1-2.3 (70/30 versify/copolymer from example 1.2), but in this case a different CRP agent is used during extrusion. A RAFT agent is added in 0.15% wt. In this case the amount of extracted material is zero and the grafting yield 100%. The example shows that the amount of living styrene acrylic copolymer grafted into the polyolefin is not only proportional and related to the amount of CRP agent added during the reactive extrusion process, but that the "optimal" amount of CRP agent needs to be adjusted depending on the CRP agent used.

Examples 2.5 and 2.6 from TABLE 2, shows the same blend discussed in examples 2.1-2.4 (70/30 versify/copolymer from example 1.2), but different CRP agents are used during extrusion. A nitroxide and an alkoxyamine are used in 0.15% wt and 0.25% wt, respectively, in examples 2.5 and 2.6. In these cases, the amount of extracted material is 13.01% wt and 15.53% wt and the grafting yields are 57% and 48%, respectively. These examples show that the grafting process of this invention can be performed with different CRP agents and that the grafting efficiency depends on both the amount of CRP agent added during the reactive extrusion process and the type of CRP agent used.

Examples 2.7 and 2.8 from TABLE 2, show grafting procedures using prior art known techniques, such as the use of a peroxide during the reactive extrusion process. As these examples show, grafting proceeds with high efficiency (91% yield), but it also has an associated polymer degradation process that is reflected in very high melt flow rates (MFR of 49 and 93 compared to 8 in the original polyolefin). It is well known that melt flow rate is related to viscosity. High viscosities provide low melt flows, and low viscosity provide high melt flows. If a polymer that has a melt flow of 8 g/10 min, as in the case of Versify, is transformed into a polymer of a melt flow of 49 or 93, the only explanation is that the molecular weight has decreased dramatically, causing a loss in viscosity. This phenomenon is widely documented in the literature, and chain scission during reactive extrusion processes using peroxides is well known. In contrast to this situation, the use of CRP agents can allow high grafting efficacies with a minimum amount of polymer degradation, as observed from melt flow rates that are like those of the original polyolefin (see example 2.2 with a 100% grafting yield and a MFR of 8.96 g/10 min which is very similar to the original polyolefin that has a MFR of 8.0). Example 2.4 shows also a 100% grafting yield, with a small amount of chain scission (MFR increased from 8 to 27.12).

Examples 2.7 and 2.8 illustrate what a process according to the present invention is not. It is not a process that uses a peroxide in a grafting step for adding functionality to a polyolefin or to a diene polymer. One embodiment of the present invention is a process for making a branched polyolefin or a branched diene polymer that comprises making a controlled free radical polymer or copolymer using a CRP process, and grafting the controlled free radical polymer or copolymer to a polyolefin or to a diene polymer in the presence of a CRP controlling agent, where a peroxide is not used in the grafting step.

Finally, examples 2.9 and 2.10 evaluate the grafting process of CRP synthesized living copolymer from example 1.4 and Versify and adding an alkoxyamine during the reactive extrusion process. Example 2.9 uses 0.5% wt of alkoxyamine and example 2.10 uses 1.5% wt of the same alkoxyamine. These examples confirm that the grafting yield is proportional to the amount of CRP agent added during the reactive extrusion process and that chain scission is very low, since the melt flow rates obtained are similar to the one of the unreacted polyolefin (10.3 and 12.3, respectively, versus 8 of the neat polyolefin).

The process disclosed in this invention proves to be very efficient in terms of grafting yields and mild in terms of chain scission, which allows the synthesis of grafted polyolefins of high molecular weight and variable functionality, which can be adjusted by simply choosing the composition of the living random styrene-acrylic copolymer to be grafted.

Figure 2:
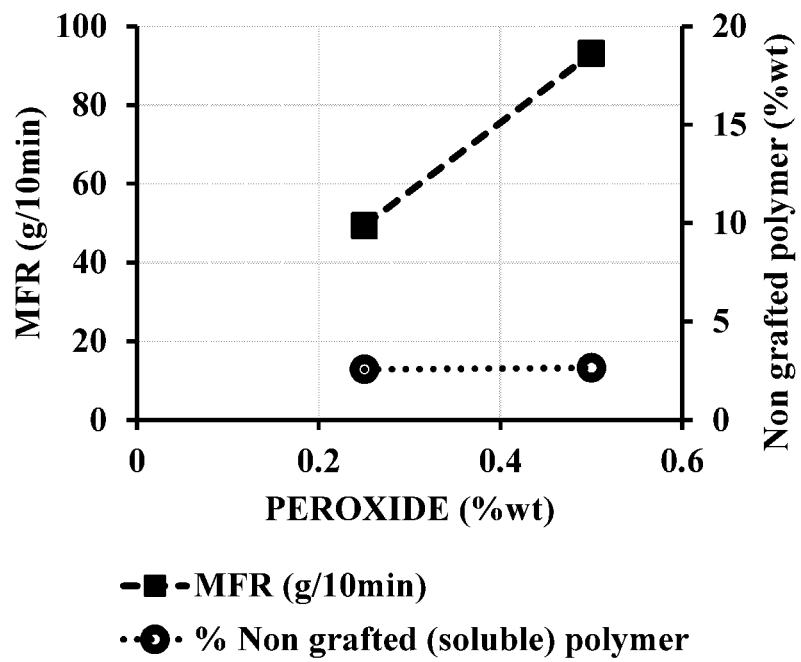
FIG. 2 shows grafting yield using a prior art grafting process, which uses a peroxide.
Figure 3:
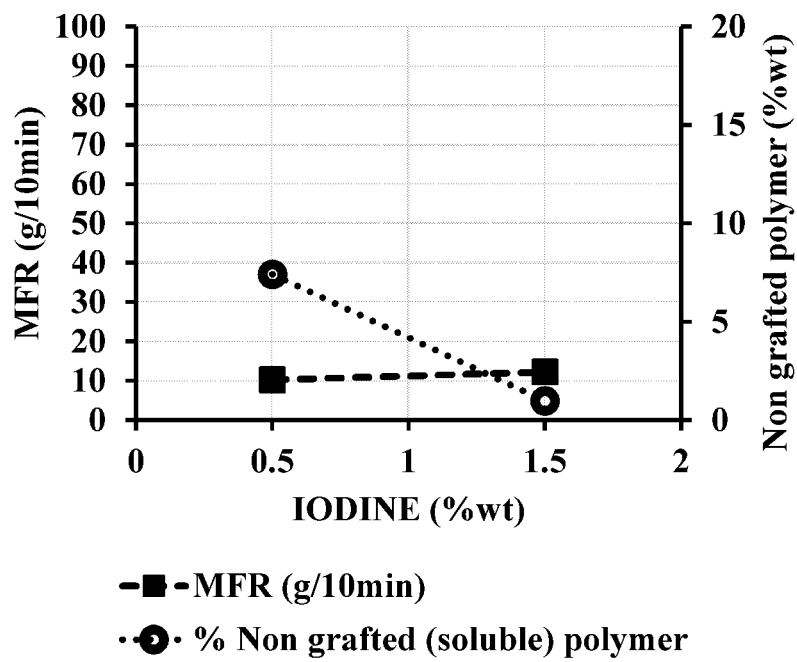
FIG. 3 shows grafting of a living styrene acrylic copolymer to a polyolefin.

The difference between using a traditional grafting process with peroxides and using a CRP agent is illustrated in FIGS. 1, 2 and 3.

FIG. 1 shows how the grafting yield (right axis, circles and dashed line) is increased when the amount of CRP agent added during the reactive extrusion process is increased (iodine) and at the same time the melt flow rate is kept similar to the melt flow rate of the neat polyolefin.

FIG. 2 shows a traditional, known in the prior art, grafting process using peroxide. Good grafting efficiencies (right axis, circles with dashed line) of around 90% are obtained, but a high chain scission is also observed, which is reflected in very high melt flow rates (left axis, squares and dashed lines). It is also interesting to observe that even when the amount of peroxide was increased from 0.25 to 0.5% wt, the grafting yield was not increased (it remained constant at 91% wt), and 100% grafting could not be achieved.

FIG. 3 shows grafting of living styrene acrylic copolymer from example 1.4 over Versify, adding 0.5 and 1.5% wt of iodine during the reactive extrusion process. In this case a good grafting yield of 75% is achieved with 0.5% wt iodine, and 100% grafting yield can be achieved with 1.5% wt iodine (right axis, circles with dashed line). In parallel, the melt flow rate is almost the same in both experiments (10.3 g/10 min and 12.3 g/10 min, respectively) and both are very similar to the melt flow of the unreacted polyolefin (8 g/10 min), reflecting a very low chain scission during the grafting process. It is important to remark that any polymer going through an extrusion process typically suffers chain scission caused by thermal and mechanical effects during this process, so one would not expect to obtain the same melt flow rate of a neat, virgin polymer before and after an extrusion process.

In these examples, the amount of CRP synthesized styrene acrylic copolymer blended with the polyolefin is 30% wt. In our experience, amounts up to 40-45% wt can be added with good results, but higher amounts are difficult to process because the rheological differences between the polyolefin and the styrene acrylic copolymer. On the other end, very small amounts (0.5, 1% wt) of styrene-acrylic copolymer synthesized using CRP can be added, but then the polyolefin modification in terms of functionality (reactive groups, polar groups) would be very small and the performance in different applications would be like a polyolefin.

The CRP controlling agent used during the grafting process is preferably iodine, a RAFT agent, an alkoxyamine, a nitroxide, an alkyl halide or an aryl halide. During the grafting process, the CRP controlling agent is typically added in an amount of between 0.01% wt and 5% wt, preferably between 0.15 and 2.5% wt and more preferably between 0.25 and 1.5% wt. The CRP synthesized polymer is typically blended with a polyolefin in a ratio of from 60/40 to 5/95, preferably in a ratio from 50/50 to 10/90 and more preferably in a ratio of from 40/60 to 15/75. The CRP synthesized polymer preferably contains one or more of the following functional groups: epoxy, hydroxyl, anhydride, amine, amide, carboxylic acid and carboxylate functional groups. The CRP synthesized polymer typically has a molecular weight of between 5,000 g/mole and 120,000 g/mole, preferably between 10,000 g/mole and 100,000 g/mole and more preferably between 15,000 g/mole and 80,000 g/mole. The grafting process is preferably performed using a twin-screw extruder at a temperature between 120° C. and 300° C., preferably between 150° C. and 280° C. and more preferably between 160° C. and 270° C.

The CRP synthesized polymers in Table 1 are random copolymers, but CRP synthesized polymers can also be block copolymers. U.S. Pat. No. 8,357,759, issued to Montiel et al., is incorporated by reference and teaches a process for making a block copolymer, which comprising: reacting an acrylic monomer (preferably selected from the group consisting of glycidyl methacrylate, 2-hydroxyethyl methacrylate, 2-dimethylaminoethyl methacrylate and 2-diethylaminoethyl methacrylate), one or more vinyl monomers, a free radical initiator and a stable free radical to form a reaction product that includes a first block and residual unreacted acrylic monomer; and reacting one or more vinyl monomers with the reaction product from the first step to form a second block that includes the residual unreacted acrylic monomer. Block copolymers made according to the U.S. Pat. No. 8,357,759 patent and its continuation U.S. Pat. No. 8,865,840, issued to González Montiel et al., which is incorporated by reference, are suitable CRP synthesized polymers for grafting polymers according to the present invention.

CRP agents used either for the synthesis of CRP polymers or during the grafting process can be acquired commercially. CRP agents can be acquired from different companies. BASF sells nitroxides and alkoxyamines, Arkema is also a supplier for specialized alkoxyamines. DyNuPol also offers special nitroxides. RAFT agents can be acquired from Sigma Aldrich, Strem Chemicals or Wako laboratory chemicals. ATRP reagents can also be acquired from Sigma Aldrich or TCI America. For iodine mediated controlled radical polymerization, alkyl halides and aryl halides are accessible from any commercial chemical products supplier, since these are reagents typically used in organic synthesis. Iodine is a chemical produced in Chile and Japan in amounts of thousand metric tons per year so it is very accessible.

Grafting Over a Variety of Polyolefins.

In these examples, 70% wt of commercially available polyolefins, 30% wt copolymer from example 1.4 (a CRP synthesized polymer), and different amounts of alkoxyamine Irgatec CR 76 (acquired from Ciba Specialty Chemicals) were blended in a Xinda PSHJ-20 co-rotating twin-screw extruder with a temperature profile of (° C.): 60, 210, 250, 230, 220, 210.

HDPE: High Density Polyethylene (J50-200-178 INEOS) was acquired from INEOS). PP copolymer: Polypropylene copolymer (2610A) was acquired from Formosa. PP homopolymer: Polypropylene copolymer (4111T) was acquired from Formosa Melt flow rates and the amount of grafted copolymer were determined as explained before for examples shown in TABLE 2.

TABLE 3

GRAFTED POLYOLEFINS USING DIFFERENT POLYOLEFINS

| Example No. | Polyolefin | Alkoxyamine (% wt) | MFR of polyolefin according to ASTM D-1238 | MFR of blend/ grafted polyolefin according to ASTM D-1238 | Non grafted Polymer (% wt) | Grafting yield (%) |
|---|---|---|---|---|---|---|
| 3.1 | HDPE | 0.25 | $2.0^a$ | $2^a$ | 2 | 93 |
| 3.2 | HDPE | 0 | | $3^a$ | 24 | 20 |
| 3.3 | PP (copolymer) | 0.25 | $10.4^b$ | $13^b$ | 12 | 60 |
| 3.4 | PP (copolymer) | 0 | | $11^b$ | 30 | 0 |
| 3.5 | PP (homopolymer) | 0.25 | $20.3^b$ | $26^b$ | 1 | 97 |
| 3.6 | PP (homopolymer) | 0 | | $22^b$ | 25 | 17 |

[a] evaluated at 190° C., 2.16 Kg
[b] evaluated at 230° C., 2.16 Kg

TABLE 3. GRAFTED POLYOLEFINS USING DIFFERENT POLYOLEFINS shows examples of a grafting process between a styrene-acrylic copolymer synthesized using a CRP process (a CRP synthesized polymer) and a polypropylene homopolymer and copolymer and a polyethylene.

As example 3.2 from Table 3 shows, when polyethylene is blended with the CRP synthesized copolymer from example 1.4 in a 70/30 ratio using a twin-screw extruder, without a CRP controlling agent, only a very small amount of grafted copolymer is obtained, since the amount of extracted material is 24% wt out of the 30% wt styrene-acrylic contained in the blend, giving a yield of 20%. Also, when polypropylene copolymer is blended with the CRP synthesized copolymer from example 1.4 in a 70/30 ratio using a twin screw extruder (example 3.4), without a CRP controlling agent, none of the copolymer is grafted into the polyolefin. Also, example 3.6 shows that if a polypropylene homopolymer is blended with the CRP synthesized copolymer from example 1.4 in a 70/30 ratio using a twin screw extruder, without a CRP controlling agent, then only 17% wt of the copolymer is grafted into the polyolefin.

In contrast to examples 3.2, 3.4 and 3.6, where no CRP controlling agent was used, examples 3.1, 3.3 and 3.5 show that if a 70/30 blend of a polyolefin and the CRP synthesized copolymer from example 1.4 are blended in an extruder with a CRP controlling agent, since 0.25% wt of an alkoxyamine is added during this process, then grafting efficiencies from 60 to 97% are obtained. In all these cases, chain scission is very low, since melt flow rate of the obtained grafted polyolefins is very similar to the melt flow rate of the original polyolefin. These examples show that the grafting procedure disclosed in this patent application can be performed with different polyolefins. Examples 3.1, 3.3 and 3.5 show that grafting a CRP synthesized polymer or copolymer to any one of several different polyolefins in the presence of a CRP controlling agent has a much higher grafting yield than if no CRP controlling agent is used during a co-extrusion process.

In these examples, the amount of CRP synthesized styrene acrylic copolymer blended with the polyolefin is 30% wt. In our experience, amounts up to 40-45% wt can be added with good results, but higher amounts are difficult to process because the rheological differences between the polyolefin and the styrene acrylic copolymer. On the other end, very small amounts (0.5, 1% wt) of styrene-acrylic copolymer synthesized using CRP can be added, but then, the polyolefin modification in terms of functionality (reactive groups, polar groups) would be very small and the performance in different applications would be similar to a polyolefin.

The CRP agent chosen for examples shown in Table 3 is an alkoxyamine. The alkoxyamine has two advantages over other CRP available agents, one is availability and the second is that it is a colorless and odorless reagent, in contrast to iodine, which, if not reacted at 100%, leaves a light purple color in the blend, and to RAFT, which has typical sulfur smell.

In one embodiment, during the grafting process, the polyolefin is selected from the group consisting of polyethylene, polypropylene, ethylene copolymers such as ethylene-propylene copolymers, ethylene-butene copolymers, ethylene-octene copolymers, ethylene-vinyl acetate copolymers, propylene copolymers such as propylene-butene, propylene-hexene, propylene-octene and terpolymers such as polypropylene/ethylene-octene.

In one embodiment, during the grafting process, the CRP synthesized polymer contains monomers which contain one or more functional groups selected from the group consisting of epoxy, hydroxyl, anhydride, amine, amide, carboxylic acid or carboxylates.

In a specific embodiment, during the grafting process, the CRP synthesized polymer contains monomers selected from the group consisting of styrene, methyl methacrylate, and glycidyl methacrylate.

In a specific embodiment, during the grafting process, the CRP synthesized polymer is synthesized using a technique selected from the group consisting of RAFT, RITP, ARGET/ICAR ATRP and NMLP.

In another embodiment, during the grafting process, the added CRP controlling agent is selected from the group consisting of iodine, RAFT, nitroxide, alkoxyamine, alkyl halide and aryl halide.

In another embodiment, during the grafting process, the added CRP controlling agent is added in a range between 0.01% and 5% wt, preferably between 0.1% and 3% wt and most preferably between 0.15% and 2.5% wt.

In another embodiment, during the grafting process, the CRP synthesized polymer is blended with a polyolefin in a range from 5/95 to 90/10, most preferably in a range between 10/90 to 50/50 most preferably in a range from 15/85 to 70/30.

In another embodiment, the grafting process is carried out using a twin-screw extruder using a temperature between 130 and 300° C., preferably between 150 and 280° C. and most preferably between 160 and 260° C.

Tables 2 and 3 show grafting examples using a CRP synthesized copolymer, a CRP agent added during the reactive extrusion process, and different polyolefins such as polypropylene, polyethylene and propylene ethylene copolymers. As is obvious to any person skilled in the art, this process is not limited to a specific type of CRP synthesized styrene acrylic copolymers, a specific type of CRP agent added during the reactive extrusion process and a specific type of polyolefin, but can be extrapolated to other living or pseudo living CRP synthesized copolymers, one or more CRP agents added during the extrusion process and an olefinic system including homo and copolymers.

The examples in Tables 2 and 3 and extrapolations of these examples that one of ordinary skill in this art can make illustrate the second step in the two-step process that has been described herein. A CRP synthesized polymer or copolymer was made in a first step. The CRP synthesized polymer or copolymer is grafted to a substrate material such as a polyolefin, a diene polymer or copolymer or polyester in the presence of a CRP controlling agent in a second step.

Generally, as a second step, what is taught herein is a process comprising mixing, preferably in a reactive extruder, or co-extruding a CRP synthesized polymer or copolymer with a polyolefin, a diene polymer or copolymer, a polyester, a polyamide or any of the other materials described herein, in the presence of a CRP controlling agent, thereby making a mixture, wherein preferably, but not necessarily, the CRP controlling agent is iodine, RAFT, nitroxide, alkoxyamine, alkyl halide, aryl halide or a combination of these agents, the process including adding the CRP controlling agent in an amount that is typically below 10% wt of the mixture, more typically ranging between 0.01% and 5% wt, preferably between 0.1% and 3% wt and more preferably between 0.15% and 2.5% wt of the mixture with examples for polyolefins ranging from 0.15 to 1.5% wt of the mixture, wherein preferred polyolefins include polyethylene, polypropylene, ethylene copolymers such as ethylene-propylene copolymers, ethylene-butene copolymers, ethylene-octene copolymers, ethylene-vinyl acetate copolymers, propylene copolymers such as propylene-butene, propylene-hexene, propylene-octene and terpolymers such as polypropylene/ethylene-octene, wherein the CRP synthesized polymer or copolymer preferably contains epoxy, hydroxyl, anhydride, amine, amide, carboxylic acid or carboxylate functional groups or a combination of these functional groups, preferably wherein the CRP synthesized polymer comprises styrene, methyl methacrylate and glycidyl methacrylate monomers, preferably wherein RAFT, RITP, ARGET/ICAR ATRP or NMLP is used in the process to make the CRP synthesized polymer or copolymer, preferably wherein the CRP synthesized polymer or copolymer is blended with the polyolefin or other material in an amount that ranges from 5/95 to 90/10, preferably in a range between 10/90 to 50/50 and more preferably in a range of from 15/85 to 70/30, preferably wherein the amount of the CRP synthesized polymer or copolymer in a blend with a polyolefin is typically between 0.5 to 50% wt, preferably between 10 and 45% wt, more preferably between 20 and 40% wt with about 25 to 35% wt or about 30% wt being most preferred, thereby making a grafted material that comprises the CRP synthesized polymer or copolymer and the polyolefin, diene polymer or copolymer, polyester, .polyamide or any of the other materials described herein C. Synthesis of Grafted Polyolefins and Dienes Using Solvent Based Reaction Example A: 680 g of styrene monomer were added to a glass stirred reactor. The styrene monomer served as a solvent. The monomer was heated up to 80° C. while 200 g of high-cis polybutadiene with a Mw of 125,800 were slowly added. The mixture was stirred until a homogenous solution was obtained. At this stage, 0.07 g of iodine and 200 g of CRP synthesized copolymer of example 1.7 were added to the reactor. The reaction was stirred at 80° C. for 3 h until the mixture color changed from pale violet to a slightly yellow color.

Example B: The same procedure described in Example A was followed, but in this case no iodine was added to the reaction.

Since the solubility of polybutadiene is similar to the solubility of the copolymer of example 1.7, the molecular weight of Examples A and B were determined using GPC. Molecular weight distributions relative to polystyrene were determined through GPC (ASTM D3536-91) using an HPLC (Agilent 1100), RI detector, THF eluent, 1.0 mL/min, at 40° C.; Two AM Gel columns 10000 A and 1000 A were used.

Figure 4:
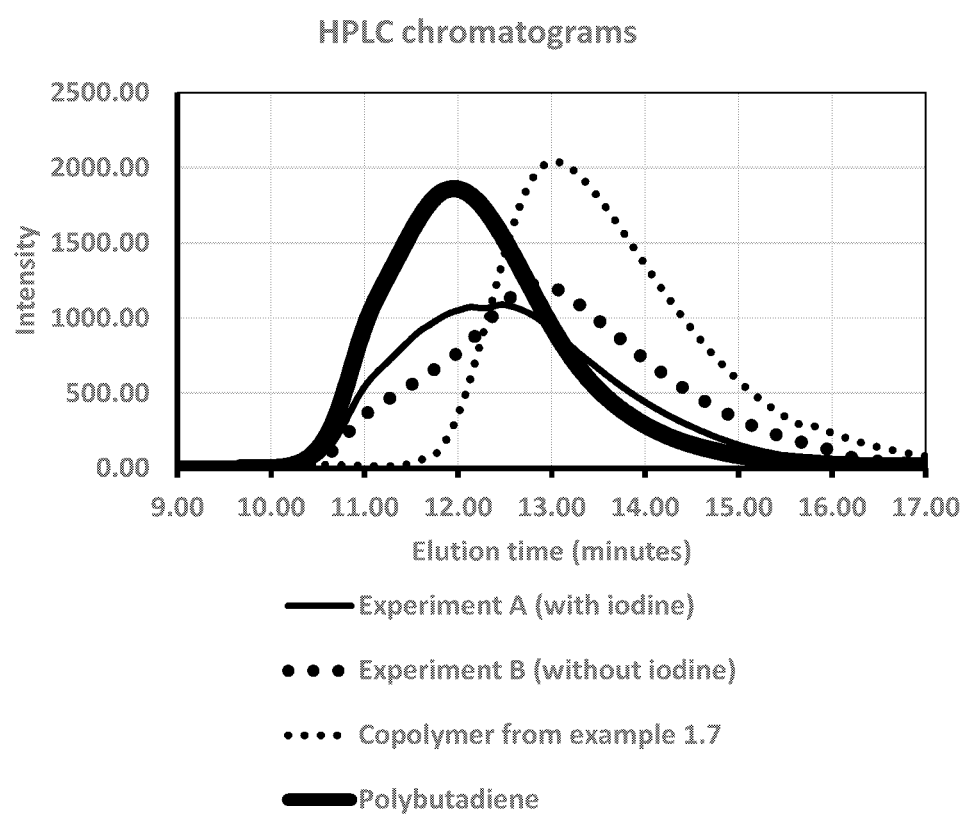
FIG. 4 shows chromatograms for particular experiments.

FIG. 4 shows the Chromatograms of experiments A and B. One can observe the intensity measured by the RI detector on the y-axis, which correlates with the concentration of each analyzed species. Elution time is shown on the x-axis. Since GPC columns are used, species are eluted according to their molecular weight. Higher molecular weight species elute first (smaller retention time) and low molecular weight species elute at last. FIG. 4 shows the GPC of polybutadiene in dark solid line, and the GPC of copolymer from example 1.7 (small dotted lines). When polybutadiene and copolymer of example 1.7 are reacted in solution (experiment B) without adding a CRP agent, the resulting copolymer shows a bimodal distribution (large dotted lines), which resemble a mere physical blend of polybutadiene and copolymer from example 1.4. In contrast, when polybutadiene and copolymer of example 1.7 are reacted in solution (experiment A) adding iodine as CRP agent during the grafting reaction, the resulting copolymer shows a distribution (solid thin line), with a molecular weight (elution time) similar to the one observed in butadiene). It is a broad but single distribution, in contrast to experiment B.

The molecular weight of experiment A (adding iodine) would be expected to be higher than polybutadiene (smaller elution times), but that applies only if the grafting process produced linear copolymers, but if grafting occurs along the polybutadiene backbone, the molecular weight cannot be calculated using linear standards. Branched copolymers tend to show lower molecular weight than linear ones.

The rheological problems discussed previously, when a reactive extrusion process is used, are overcome with a solution based process, since in this case, both components are in solution and the reaction is not limited by viscosity of the components. Example A allows the reaction between 50% wt polybutadiene and 50% wt of copolymer from example 1.4. In this case only 0.0175% wt of iodine was used to guarantee that all reacted and that the final grafted polybutadiene would not show an undesirable (violet) color.

In one embodiment, during the grafting process, the diene is selected from the group consisting of any diene rubber or mixture of diene rubbers, i.e., any rubbery polymer (a polymer having a second order transition temperature not higher than 0° C., preferably not higher than −20 C., as determined by ASTM test D-746-52T) of one or more conjugated 1,3-dienes, e.g., butadiene, isoprene, piperylene, chloroprene, etc. Such rubbers include homopolymers of conjugated 1,3-dienes, interpolymers of conjugated 1,3-dienes with one another, and interpolymers of one or more conjugated 1,3-dienes, isomeric forms such as high cis, low cis, high vinyl, high trans, diene copolymers such as ABS, and butadiene-styrene copolymers.

In one embodiment, during the diene grafting process, the CRP synthesized polymer contains monomers which contain one or more functional groups selected from the group consisting of epoxy, hydroxyl, anhydride, amine, amide, carboxylic acid or carboxylates.

In a specific embodiment, during the diene grafting process, the CRP synthesized polymer contains monomers selected from the group consisting of styrene, methyl methacrylate, and glycidyl methacrylate.

In a specific embodiment, during the diene grafting process, the CRP synthesized polymer is synthesized using a technique selected from the group consisting of RAFT, RITP, ARGET/ICAR ATRP and NMLP In another embodiment, during the diene grafting process, the added CRP controlling agent is selected from the group consisting of iodine, RAFT, nitroxide, alkoxyamine, alkyl halide and aryl halide In another embodiment, during the diene grafting process, the added CRP controlling agent is added in a range between 0.005% and 5% wt, preferably between 0.01% and 3% wt and most preferably between 0.015% and 2.5% wt.

In another embodiment, during the diene grafting process, the CRP synthesized polymer is blended with a diene in a range from 5/95 to 90/10, more preferably in a range between 10/90 to 80/20 most preferably in a range from 20/80 to 70/30.

In another embodiment, the diene grafting process is carried out using a stirred reactor using a temperature between 50 and 200° C., preferably between 60 and 180° C. and most preferably between 65 and 150° C.

In another embodiment, the diene grafting process is carried out using a twin-screw extruder between 150° C. and 250° C., preferably between 160 and 220° C.

In a specific embodiment, during the grafting process, polybutadiene and a styrene acrylic copolymer synthesized using a CRP process are reacted in solution, using iodine as a CRP controlling agent.

Examples A and B show grafting examples using a CRP synthesized copolymer, a CRP and polybutadiene using a solution process. It is obvious to any person skilled in the art, that this process is not limited to a specific type of CRP synthesized polymer, a specific type of CRP agent added during the grafting process and a specific type of diene, but can be extrapolated to other living or pseudo living CRP synthesized polymers and copolymers, one or more CRP agents added during the grafting process and a wide variety of dienes.

The following examples show unexpected results of the performance obtained of CRP synthesized copolymers from TABLE 1. Copolymers synthesized using CRP as chain extenders of polyesters and polyamide and as coupling agents.

D. CRP Synthesized Polymers as Polyester Modifiers

Poly Lactic Acid, PLA (Ingeo 3251D); Polyethylene terephthalate, PET (Promalene DS1910) and Polybutylene terephthalate, PBT (Crastin CE2055) were used as received. In the case of the polyesters modified using CRP synthesized polymers, pellets were weighed according to TABLE 4, and were dry blended before adding them to the twin screw extruder main feeder. Melt flow was measured according to ASTM D-1238.

TABLE 4

Polyesters modified using CRP synthesized polymers.

| Example No. | Polymer from Example No. | % wt of additive | Polyester | % wt of polyester | Melt flow index (g/10 min) |
|---|---|---|---|---|---|
| 4.1 | None | 0 | PBT | 100 | 65.9 |
| 4.2 | 1.2 | 1 | PBT | 99 | 63.3 |
| 4.3 | 1.2 | 3 | PBT | 97 | 57.0 |
| 4.4 | 1.2 | 5 | PBT | 95 | 43.3 |
| 4.5 | None | 0 | PET | 100 | 15.2 |
| 4.6 | 1.4 | 3 | PET | 97 | 14.2 |
| 4.7 | 1.2 | 3 | PET | 97 | 13.8 |
| 4.8 | None | 0 | PLA | 100 | 21.3 |
| 4.9 | 1.1 | 3 | PLA | 97 | 13.3 |
| 4.10 | 1.2 | 3 | PLA | 97 | 5.6 |

Figure 5:
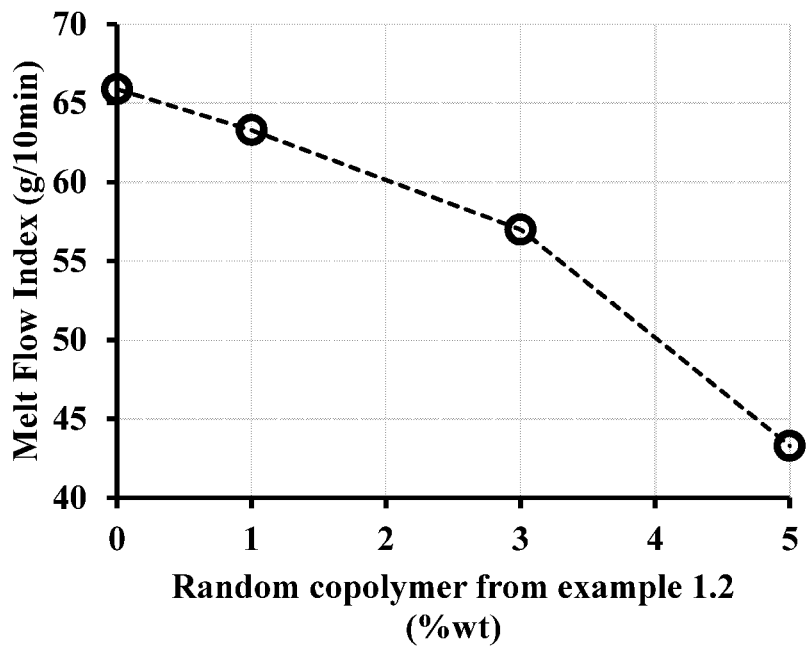
FIGS. 5-14 provide graphical representations of data from identified examples.
Figure 6:
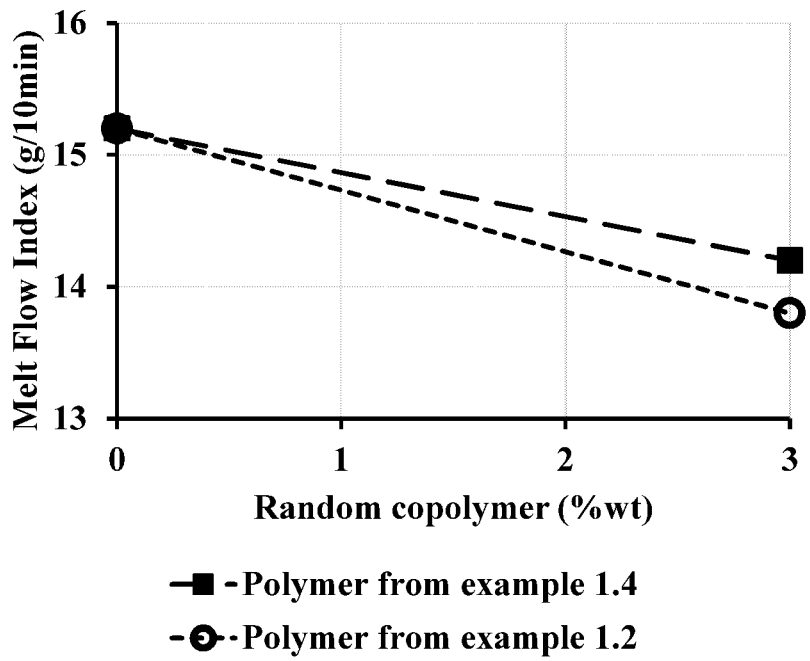
Figure 7:
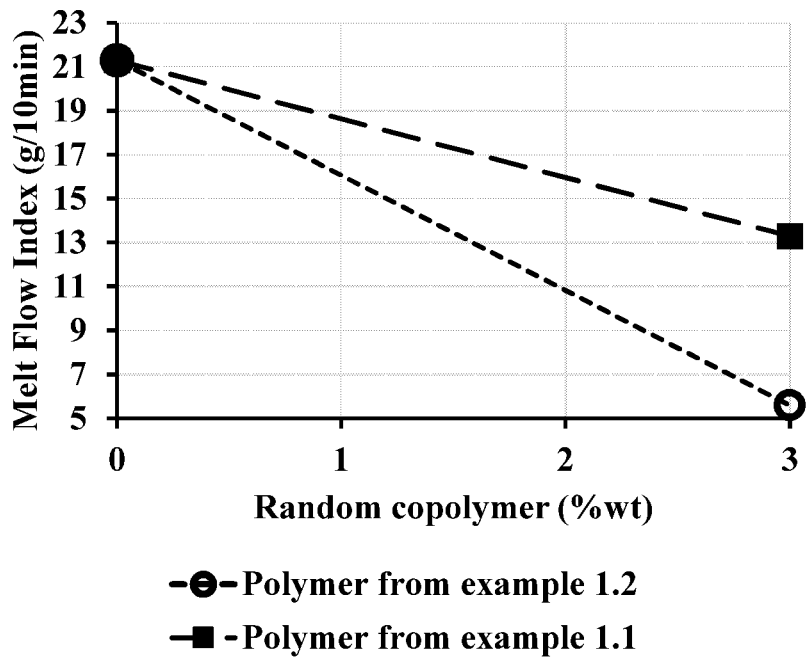

As TABLE 4 shows, viscosity is increased (MFI decreases) when the CRP synthesized polymers containing epoxy groups are added to different polyesters. FIGS. 5, 6 and 7, show how the viscosity increment is proportional to the amount of additive added which can be explained by a chain extension reaction between the CRP synthesized random polymers and the polyester. In the case of PBT (examples 4.1 to 4.4), the melt flow is reduced from 65.9 g/10 min to 43.3 g/10 min when 5% wt Copolymer from example 1.2 is added, which can only be explained by an increase in the molecular weight of PBT that translates in higher viscosity. In the case of PET, copolymers from example 1.4 and 1.2 are added at 3% wt, as shown in examples 4.6 and 4.7. In this case the melt flow is reduced from 15.2 g/10 min to 14.2 and 13.8 respectively. Finally, in the case of PLA, copolymers from examples 1.1 and 1.3 are blended at 3% wt and a reduction in melt flow from 21.3 g/10 min to 13.3 and 5.6 g/10 min, respectively is obtained, as shown in examples 4.9 and 4.10.

The degradation of condensation polymers via hydrolysis, alcoholysis, thermal cleavage and other mechanisms is known to be severe. The main reason is that condensation thermoplastics such as poly(ethyleneterephthalate) (PET), poly(butyleneterephthalate) (PBT), polyamide 6 (PA6), polyamide 6,6 (PA66), bisphenol A (BPA) based polycarbonates (PC), thermoplastic polyurethanes (PUR), as well as their blends, are processed at very high temperatures (around 300° C.) where the rate of these degradation reactions are extremely rapid. These degradation reactions result in severe loss of molecular weight and mechanical and thermal properties, reducing the possibilities for reprocessing large amounts of post-industrial regrind or postconsumer recycled materials into demanding engineering applications.

Chain extension is useful in the case of recycled condensation polymers, which lose viscosity after being exposed to weathering conditions, allowing a recovery in viscosity that enables the transformation of recycled streams in useful materials, through injection molding or film forming processes. Another important application is the field of condensation thermoplastics polymer blends, in the case where they need to be blended with other polymers that have higher viscosities (lower melt flows), to allow for a better mixing during extrusion or other transformation processes.

Chain extenders have at least two functional groups capable of addition reactions with the terminal hydroxyl (OH) or carboxyl (COOH) groups of the condensation polymers. In principle, any bifunctional (or higher functionality) chemical that reacts fast with the end groups of condensation thermoplastics may be used for chain extension or coupling.

The amount of chain extender needs to be carefully adjusted for specific applications. If too much chain extender is added, the viscosity could increase beyond the processability limits, causing clogging in the extruders or injection molding machines.

Chain extension using CRP synthesized styrene acrylic random copolymers with epoxy groups, disclosed in the present invention, show excellent performance, are easy to handle (since they are not oligomers nor liquids) and easy to add directly in common transformation equipment used in the plastic industry (e.g. extruders, injection molding machines, film extrusion, etc.)

Chain extension process using CRP synthesized styrene acrylic copolymers bearing epoxy functionality, such as the ones shown in TABLE 4 is exemplified with typical polyesters, but it is obvious to any person skilled in the art that they can be used with other condensation polymers, combinations of condensation polymers, and in addition to other additives present in different formulations such as impact modifiers, UV stabilizers, etc., and other fillers including inorganic and organic fillers.

Regarding the molecular weight of CRP synthesized copolymers containing epoxy functionality, according to our experience, a molecular weight in number higher than 10,000 g/mole reacts with no rheological problems in a screw extruder with different polyesters. Copolymers of lower molecular weight, which would exhibit higher viscosity, would probably present mixing problems with polyesters. The limit molecular weight of these CRP synthesized copolymers containing epoxy functionality is around 150,000-200,000 g/mole, since CRP processes show poor control (high polydispersity) of the molecular weight as it increases.

A specific type of condensation polymers are polyesters. Polyesters suitable for chain extension are, in general, relatively high in molecular weight and may be branched or linear polymers. These include polyesters such as polyethylene terephthalate (PET), polybutylene terephthalate (PBT), polycyclohexane-bis-methylene terephthalate (PCT), and thermoplastic elastomeric, or combinations of these thermoplastic elastomeric polyesters with other above polyesters such as PBT. Polyesters suitable for compositions of the present invention include, in general, linear saturated condensation products of diols and dicarboxylic acids, or reactive derivatives thereof. Preferably, they are polymeric glycol esters of terephthalic acid and isophthalic acid. These polymers are available commercially or can be prepared by known techniques.

In one embodiment, during the chain extension process, the condensation polymer is selected from the group consisting of polyesters, polyamides, polycarbonates and polyurethanes.

In a preferred embodiment, during the chain extension process, the condensation polymer is selected from the group consisting of polybutylene terephthalate, polyethylene terephthalate, poly lactic acid and PHA.

In one embodiment, during the chain extension process, a condensation polymer and a styrene acrylic copolymer containing epoxy functionality, synthesized using a CRP are reacted.

In one embodiment, during the chain extension process, a condensation polymer and a styrene acrylic copolymer containing epoxy functionality, synthesized using a CRP are reacted, where the copolymer contains from 1 to 50% wt of glycidyl methacrylate, preferably from 5 to 40% wt of glycidyl methacrylate and most preferably from 10 to 30% wt of glycidyl methacrylate.

In one embodiment, during the chain extension process, a condensation polymer and a styrene acrylic copolymer containing epoxy functionality, synthesized using a CRP are reacted, where the copolymer has a molecular weight in number from 9,000 g/mole to 200,000 g/mole, preferably from 10,000 g/mole to 150,000 g/mole and most preferably from 15,000 g/mole to 100,000 g/mole.

In one embodiment, during the chain extension process, a condensation polymer and a styrene acrylic copolymer containing epoxy functionality, synthesized using a CRP are reacted in molten phase.

In one embodiment, during the chain extension process, a condensation polymer and a styrene acrylic copolymer containing epoxy functionality, synthesized using a CRP are reacted, where the CRP synthesized polymer is synthesized using a technique selected from the group consisting of RAFT, RITP, ARGET/ICAR ATRP and NMLP.

E. CRP Synthesized Polymers as Polyamide Chain Extenders.

Recycled polyamide 6 with 30% glass fiber and copolymer from example 1.2, were dry blended in the ratios shown in TABLE 5. Polyamide modified using CRP synthesized polymers. before adding them to the twin screw extruder main feeder. Melt flow was measured according to ASTM D-1238.

TABLE 5

Polyamide modified using CRP synthesized polymers.

| Example No. | % wt of copolymer from example 1.2 | % wt of polyamide 6/30% glass fiber | Melt flow Index @ 275° C./0.325 Kg (g/10 min) |
|---|---|---|---|
| 5.1 | 0 | 100 | 7.8 |
| 5.2 | 0.5 | 99.5 | 4.9 |
| 5.3 | 1 | 99 | 4.5 |

Figure 8:
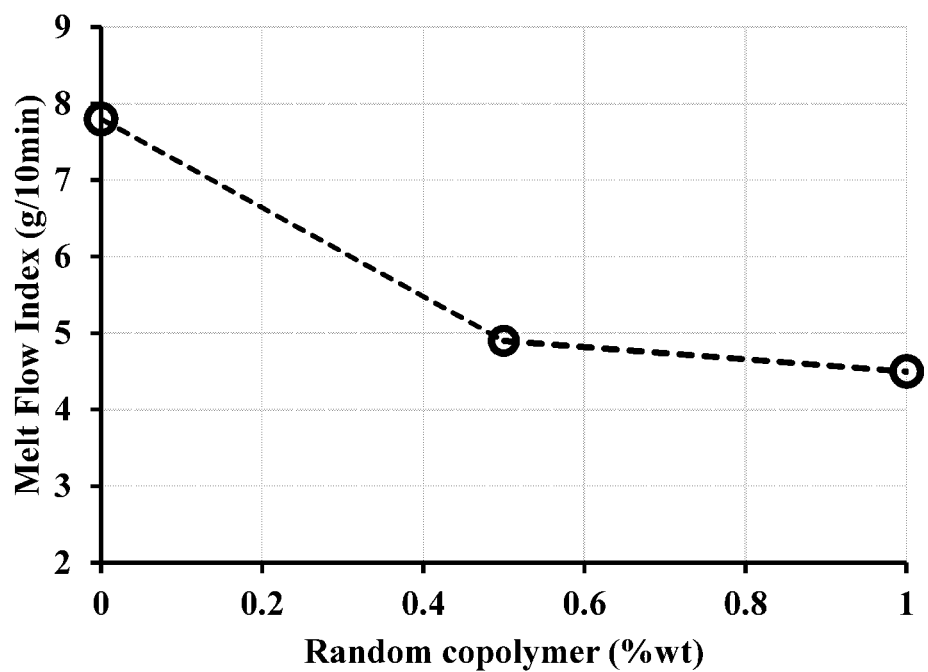

As TABLE 5. Polyamide modified using CRP synthesized polymers. and FIG. 8 show, the melt flow of polyamide 6+30% glass fiber is reduced when copolymer from example 1.2 is added. With 1% wt of copolymer from example 1.2 a melt flow reduction from 7.8 g/10 min to 4.5 g/10 min is obtained. The reduction in melt flow can be explained by an increment in the molecular weight of the polyamide, which shows a higher viscosity and thus, a lower melt flow.

Condensation polymers that can be used in the chain extension process include polyamide 6, polyamide 66, polyamide 11, polyamide 12, linear polyamides, branched polyamides and cyclic polyamides. In one embodiment, during the chain extension process, the condensation polymer contains inorganic fillers such as glass fiber, talc, mica, calcite, silicates, silicones, wollastonite, kaolinitic clay, calcined kaolinitic clay, a calcium carbonate, and bauxite.

In one embodiment, during the chain extension process, a polyamide and a styrene acrylic copolymer containing from 5 to 50% weight of glycidyl methacrylate, synthesized using a CRP process are reacted.

In one embodiment, during the chain extension process, a polyamide and a styrene acrylic copolymer containing from 5 to 50% weight of glycidyl methacrylate, synthesized using a CRP process and bearing a molecular weight from 10,000 g/mole to 150,000 g/mole are reacted.

In one embodiment, during the chain extension process, a polyamide and a styrene acrylic copolymer containing from 5 to 50% weight of glycidyl methacrylate, synthesized using a CRP process and bearing a molecular weight from 15,000 g/mole to 100,000 g/mole are reacted.

F. MBS-PLA Compatibilization Using CRP Synthesized Polymers

Poly Lactic Acid, PLA (Ingeo 3251D) and the co-polymer methyl methacrylate-butadiene-styrene (MBS) was used as received. Blends were dry blended according to TABLE 6 and added to the twin screw extruder main feeder. Notched Izod Impact specimens were injected and tested according to ASTM D256.

TABLE 6

MBS-PLA Compatibilization

| Example No. | Polymer from Example No. 1.4 (% wt) | MBS (% wt) | PLA (Ingeo 3251D) (% wt) | Notched Izod (ft-lb/in) |
|---|---|---|---|---|
| 6.1 | 1 | 20 | 79 | 0.81 |
| 6.2 | 3 | 10 | 87 | 0.42 |
| 6.3 | 3 | 20 | 77 | 3.93 |

As TABLE 6, example 6.1 shows, when MBS impact modifier is blended with polylactic acid and 1% wt of copolymer from example 1.4, a poor impact of 0.81 ft-lb/in is obtained. If the impact modifier is reduced to 10% and the amount of copolymer from example 1.4 is increased (example 6.2), the impact is even lower (0.42 ft-lb/in). If 3% wt of copolymer from example 1.4 and 20% wt MBS impact modifier are added during the extrusion process, impact is improved up to 3.93 ft-lb/in. In these examples, we observe a compatibilization behavior of polymer 1.4 between PLA and MBS, which is explained by the reaction of the epoxy groups of copolymer from example 1.4 and PLA and a miscibility between the methacrylic phase of MBS and methyl methacrylate contained in copolymer from example 1.4.

In one embodiment, a blend of Poly lactic acid and methyl methacrylate butadiene styrene impact modifier is compatibilized using a styrene acrylic copolymer bearing epoxy functional groups, synthesized using a CRP process.

In one preferred embodiment, a blend of Poly lactic acid and methyl methacrylate butadiene styrene impact modifier is compatibilized using a styrene acrylic copolymer containing from 5 to 50% weight of glycidyl methacrylate, synthesized using a CRP process In one preferred embodiment, a blend of Poly lactic acid and methyl methacrylate butadiene styrene impact modifier is compatibilized using a styrene acrylic copolymer containing from 5 to 50% weight of glycidyl methacrylate and bearing a molecular weight from 10,000 g/mole to 150,000 g/mole, synthesized using a CRP process G. ABS-PLA Compatibilization Using CRP Synthesized Polymers Poly Lactic Acid, PLA (Ingeo 3251D) and Acrylonitrile-butadiene-styrene copolymer, ABS (Teluran HI 10 from BASF) were used as received. Blends were dry blended according to TABLE 7 and added to the twin screw extruder main feeder. Notched Izod Impact specimens were injected and tested according to ASTM D256.

TABLE 7

ABS-PLA Compatibilization

| Example No. | ABS (% wt) | PLA (% wt) | Polymer from example No 1.4 (% wt) | Notched Izod Impact (J/m) |
| --- | --- | --- | --- | --- |
| 7.1 | 50 | 50 | 0 | 26.50 |
| 7.2 | 50 | 50 | 2.5 | 32.53 |
| 7.3 | 50 | 50 | 5 | 37.32 |
| 7.4 | 65 | 35 | 0 | 23.30 |
| 7.5 | 65 | 35 | 2.5 | 44.88 |
| 7.6 | 65 | 35 | 5 | 45.67 |

ABS is a copolymer that bears good impact properties, whereas PLA is a very brittle polymer, exhibiting low impact properties. Blends of these polymers are attractive because a material containing a biodegradable polymer such as PLA and a polymer with good impact properties would be obtained; the problem is that ABS and PLA are very dissimilar materials in terms of monomeric composition, so a miscible or compatible blend wouldn't be expected. To overcome this situation, a copolymer synthesized using CRP and bearing epoxy groups can be used, since it would react with the terminal carboxylic acid groups contained in PLA and the Styrenic phase would be compatible with the Styrenic phase in ABS.

As TABLE 7 shows, a 1/1 blend of ABS and PLA shows a notched Izod impact of 26.5 J/m (example 7.1). If 2.5% wt of copolymer from example 1.4 is added, the impact goes up to 32.53 J/m (Example 7.2), and if the amount of copolymer from example 1.4 is increased to 5%, the impact goes up again to 37.32% (example 7.3). If the same set of experiments is carried on using a 65/35 ABS/PLA blend, the same trend is observed, in this case, even higher increments in Notched Izod impacts are obtained, starting at 23.3 J/m when no copolymer from example 1.4 is added (Example 7.4), and going up to a value of 45.67 J/m when 5% wt of copolymer from example 1.4 is added. These set of experiments reveal a compatibilization behavior.

In one embodiment, a blend of a polyester and a styrene homopolymer or styrene containing copolymer is compatibilized using a styrene acrylic copolymer containing from 5 to 50% weight of glycidyl methacrylate and bearing a molecular weight from 10,000 g/mole to 150,000 g/mole, synthesized using a CRP process In one embodiment, a blend of Poly lactic acid and acrylonitrile butadiene styrene, is compatibilized using a styrene acrylic copolymer bearing epoxy functional groups, synthesized using a CRP process.

In one embodiment, a blend of polylactic acid and acrylonitrile butadiene styrene is compatibilized using a styrene acrylic copolymer containing from 5 to 50% weight of glycidyl methacrylate, synthesized using a CRP process In one embodiment, a blend of polylactic acid and acrylonitrile butadiene styrene is compatibilized using a styrene acrylic copolymer containing from 5 to 50% weight of glycidyl methacrylate and bearing a molecular weight from 10,000 g/mole to 150,000 g/mole, synthesized using a CRP process The following examples show the performance of grafted polyolefins as coupling agents of polyolefins and different fillers. The examples do not pretend to be limitative but mostly illustrative of the potential applications of grafted polyolefins disclosed in the present patent applications. Similar applications are obvious to the skilled person, such as using other fillers (e.g. cellulose instead of agave fiber), other polyolefins (e.g. polyethylene or olefinic copolymers instead of polypropylene) and different ratios of fillers, olefinic matrices and coupling agents.

H. Polypropylene Wallastonite Compatibilization Using Grafted Polyolefins

A blend of 90% wt Formosa Polypropylene 4111T and 10% wt Polypropylene 2610A was used as the base resin. Wollastonite, Nyco NYAD M325 was used as received. Materials were dry blended in the ratios shown in TABLE 8 in a twin-screw extruder using a temperature profile of (° C.): 60, 190, 200, 210, 220, 220.

Prototypes were injected and tensile properties were measured according to ISO 527.

TABLE 8

Grafted polyolefin from example 3.4 as coupling agent for polypropylene + Wollastonite

| Example | Wollastonite (%) | Polypropylene (%) | Grafted polyolefin from example 3.4 (% wt) | Young Modulus (MPa) (ISO 527, 50 mm/min) |
| --- | --- | --- | --- | --- |
| 8.1 | 20 | 75 | 5 | 1,273 |
| 8.2 | 30 | 65 | 5 | 1,402 |
| 8.3 | 40 | 55 | 5 | 1,660 |
| 8.4 | 20 | 80 | 0 | 1,143 |
| 8.5 | 30 | 70 | 0 | 1,282 |
| 8.6 | 40 | 60 | 0 | 1,483 |

Figure 9:
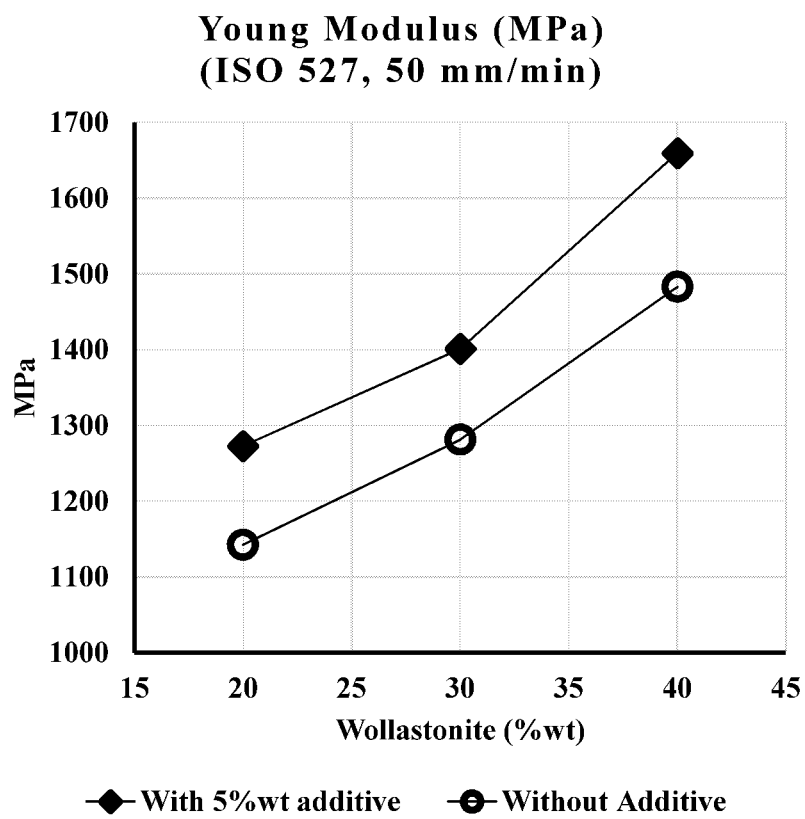

As FIG. 9 shows, the tensile modulus is increases as the amount of Wollastonite is increased in polypropylene/Wollastonite composites (solid line, hollow circles). The modulus increases from 1,143 MPa with 20% wt Wollastonite (example 8.4), to 1,483 MPa when 40% wt Wollastonite is added (Example 8.6). If a grafted polyolefin from example 3.4 is added to these composites, during the blend extrusion process, higher modulus is obtained (solid line, rhombus in FIG. 9). For polypropylene with 20% wt Wollastonite and 5% wt grafted polyolefin, a Young modulus of 1,273 MPa is obtained (example 8.1), which is 130 MPa higher to the composite without grafted polyolefin. A Young modulus of 1,660 MPa can be achieved when 40% wt Wollastonite and 5% grafted polyolefin form example 3.4 is added, which is 177 MPa higher than the composite without grafted polyolefin.

The grafted polyolefin added to the polypropylene/Wollastonite system, acts as a coupling agent. Presumably, the epoxy groups contained in the grafted polyolefin, react or interact with Wallastonite and the polyolefin backbone is miscible with the polypropylene matrix.

I. Polypropylene Glass Fiber Compatibilization Using Grafted Polyolefins

A blend of 90% wt Formosa Polypropylene 4111T and 10% wt Polypropylene 2610A was used as the base resin. Glass fiber was used as received. Materials were dry blended in the ratios shown in TABLE 9 in a twin-screw extruder using a temperature profile of (° C.): 60, 190, 200, 210, 220, 220.

Prototypes were injected and tensile properties were measured according to ISO 527.

TABLE 9

Grafted polyolefin from example 3.4 as coupling agent for polypropylene + glass fiber

| Example | Glass Fiber (% wt) | Polypropylene (% wt) | Grafted polyolefin from example 3.4 (% wt) | Young Modulus (MPa) (ISO 527) |
|---|---|---|---|---|
| 9.1 | 20 | 80 | 0 | 1,695 |
| 9.2 | 20 | 75 | 5 | 1,913 |

As TABLE 9 shows, a polypropylene-glass fiber composite containing 20% wt of glass fiber is efficiently coupled using grafted polyolefin from example 3.4 is used as coupling agent. An increment of 13% in Young Modulus is observed when grafted polyolefin from example 3.4 is incorporated in the blend.

Like examples shown in Table 8, The grafted polyolefin added to the polypropylene/glass fiber system, acts as a coupling agent. Presumably, the epoxy groups contained in the grafted polyolefin, react or interact with glass fiber, and the polyolefin backbone is miscible with the polypropylene matrix.

In one embodiment, a composite of a polyolefin and an inorganic filler is coupled using a grafted polyolefin which is obtained by a process comprising:
 i) making a controlled free radical polymer or copolymer using a controlled free radical polymerization process; and
 ii) grafting the controlled free radical polymer or copolymer to a polyolefin backbone in the presence of a CRP controlling agent.

In a preferred embodiment, the amount of inorganic filler is between 5% and 60% wt, preferably between 10% and 50% wt.

In one embodiment, the amount of grafted polyolefin used as coupling agent is between 1% wt to 40% wt, preferably between 3% wt and 20% wt and most preferably between 5% wt and 10% wt.

J. Polypropylene Agave Fiber Compatibilization Using Grafted Polyolefins

A blend of 90% wt Formosa Polypropylene 4111T and 10% wt Polypropylene 2610A was used as the base resin. Agave Fiber "000" from Biosolutions was dried for 4 h at 80° C. before using. Struktol TPW 104 was used as received. Grafted polyolefin from example 3.4 was used as coupling agent.

Materials were dry blended in the ratios shown in TABLE 10. Mechanical properties of polypropylene with agave fiber in a twin-screw extruder using a temperature profile of (° C.): 60 140 150 160 170 170.

Prototypes were injected and Tensile properties were measured according to ISO 527. Flexural modulus was measured according to ISO 178.

TABLE 10

Mechanical properties of polypropylene with agave fiber

| Example No. | Agave Fiber (% wt) | Coupling Agent (% wt) | Young Modulus (Mpa) (ISO 527) | Tensile strength at yield (MPa) (ISO 527) | Tensile Strength at break (MPa) (ISO 527) |
|---|---|---|---|---|---|
| 10.1 | 0% | 0 | 947.4 | 38.4 | 23.4 |
| 10.2 | 5% | 5 | 1313.0 | 41.4 | 30.4 |
| 10.3 | 10% | 5 | 1324.8 | 41.0 | 32.6 |
| 10.4 | 20% | 5 | 1398.8 | 37.9 | 28.4 |
| 10.5 | 40% | 5 | 1622.2 | 33.8 | 27.6 |
| 10.6 | 5% | 0 | 1212.9 | 38.2 | 28.5 |
| 10.7 | 10% | 0 | 1203.9 | 36.7 | 27.7 |
| 10.8 | 20% | 0* | 1259.4 | 33.1 | 26.7 |
| 10.9 | 40% | 0* | 1497.1 | 29.8 | 24.3 |

| Example No. | Agave Fiber (% wt) | Coupling Agent (% wt) | Flexural Modulus (MPa) (ISO 178) | Maximum Flexural Stress (MPa) (ISO 178) |
|---|---|---|---|---|
| 10.1 | 0% | 0 | 1702.8 | 49.4 |
| 10.2 | 5% | 5 | 2141.2 | 55.4 |
| 10.3 | 10% | 5 | 2382.2 | 57.1 |
| 10.4 | 20% | 5 | 3251.1 | 68.1 |
| 10.5 | 40% | 5 | 4124.2 | 62.1 |
| 10.6 | 0% | 0 | 1702.8 | 49.4 |
| 10.7 | 5% | 0 | 1705.3 | 46.0 |
| 10.8 | 10% | 0 | 1854.7 | 46.9 |
| 10.9 | 20% | 0* | 2028.4 | 45.9 |
| 10.10 | 40% | 0* | 3137.2 | 47.9 |

*To process these examples, Struktol TPW 104 @ 3% was added as lubricating agent.

Composites of polyolefins and natural fibers are very interesting systems, since they incorporate materials which are biodegradable and renewable. In contrast with inorganic fillers, such as glass fiber and talc, the density of natural fibers is considerably lower, so light weight composites could be obtained as an additional advantage. The challenge found in natural fiber composites is to incorporate a very polar, hygroscopic material, such as the natural fiber, which typically contains high levels of cellulose, with a very non-polar hydrophobic matrix such as a polyolefin. To overcome this problem, coupling agents need to be incorporated.

Figure 10:
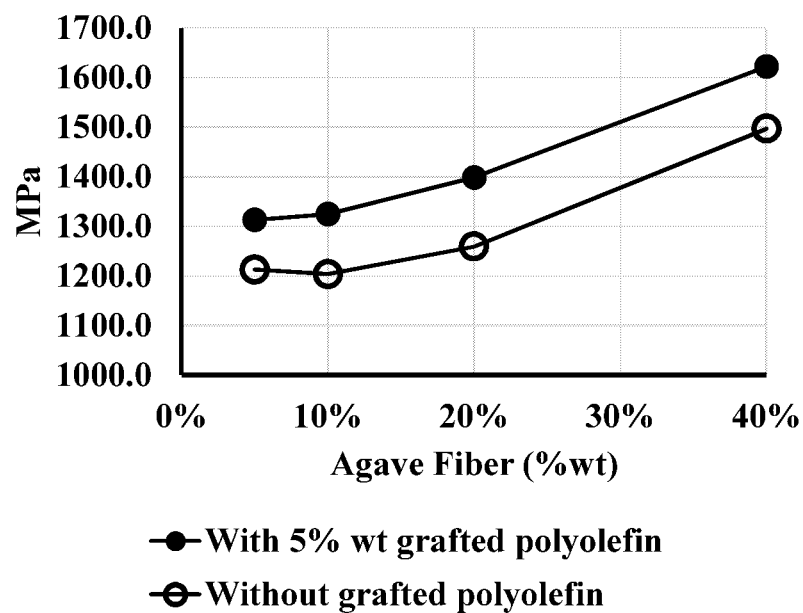

As TABLE 10. Mechanical properties of polypropylene with agave fiber and FIG. 10 shows, the Young modulus increases as agave fiber is incorporated to the polypropylene, as expected with any filler (Examples 10.6-10.9, solid line with hollow circles in FIG. 10), but when grafted polyolefin from example 3.4 is added to these blends, the tensile modulus increases even more (solid line, solid circles in FIG. 10), achieving modulus of 1622 MPa at 40% loading of agave fiber and 5% wt of grafted polyolefin from example 3.4 (example 10.9) vs 1491MPa when similar ratios but no grafted polyolefin is added (Example 10.9)

Figure 11:
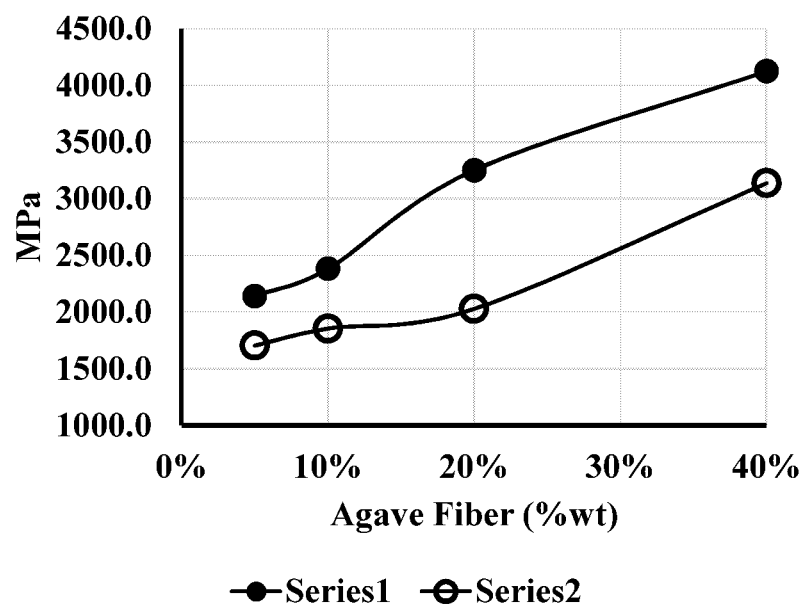

FIG. 11 shows the same trend in the flexural modulus, as agave fiber is incorporated, the flexural modulus increases (solid line, hollow circles), but in all cases, when 5% grafted polyolefin is incorporated, higher flexural modulus are obtained (solid line, solid circles). Grafted polyolefin is performing as an excellent coupling agent in these blends, increasing both tensile and flexural properties. Since grafted polyolefin from example 3.4 contains epoxy groups, a reasonable explanation is that epoxy groups react with hydroxyl groups present in agave fiber cellulose, forming a covalent, strong bond. On the other hand, the polypropylene backbone is completely miscible with the polypropylene matrix, providing an excellent interphase between both, the filler and the olefinic matrix.

K. Polypropylene Sisal Fiber Compatibilization Using Grafted Polyolefins

A blend of 90% wt Formosa Polypropylene 4111T and 10% wt Polypropylene 2610A was used as the base resin. Sisal Fiber Grade 3 from Tanzania was dried for 4h at 80° C. before use. Struktol TPW 104 was used as received. Grafted polyolefin from example 3.4, Lotader AX8930 (Reactive Ethylene-Acrylate-Glycidyl Methacrylate terpolymer) from Arkema and Polybond3200 (maleic anhydride modified polypropylene homopolymer) from Addivant were used without drying. Materials were dry blended in the ratios shown in TABLE 11 in a twin-screw extruder using a temperature profile of (° C.): 60 140 150 160 170 170 ° C.

Prototypes were injected and tensile properties were measured according to ISO 527. Flexural modulus was measured according to ISO 178.

vide a light weight filler in polyolefin composites. Like the polypropylene-agave system, sisal fiber and polyolefins require the use of coupling agents to overcome the dissimilar properties between both materials (sisal is a very hydrophilic, polar material, and the polyolefin is hydrophobic and non-polar).

Figure 12:
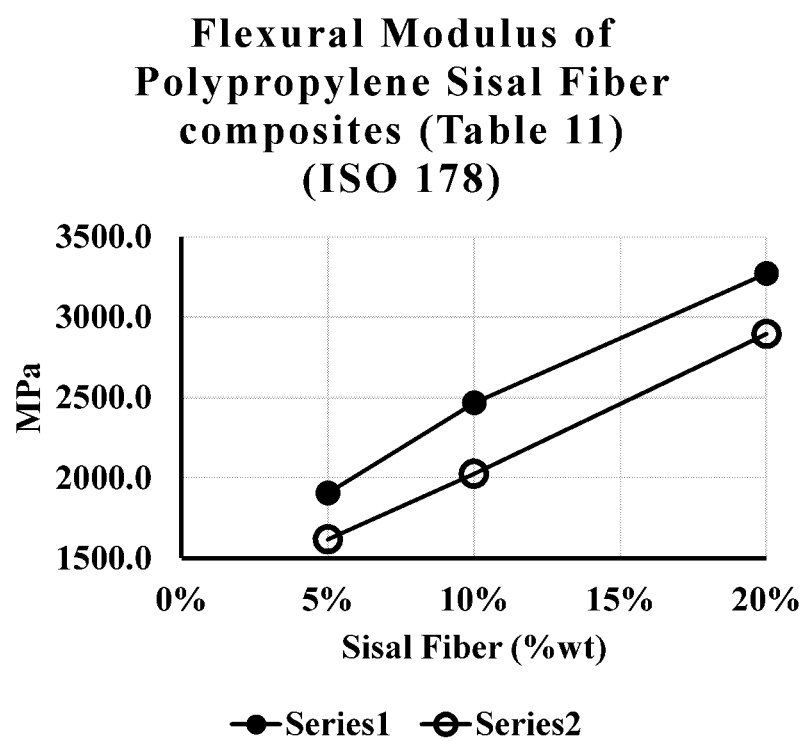

As FIG. 12 shows, when polypropylene is compounded with sisal fiber at 5%, 10% and 20% sisal fiber, the flexural modulus increases, as expected with any filler (solid line with hollow circles). When grafted polyolefin from example 3.4 is incorporated in these blends, the flexural modulus increases even more (FIG. 12, solid line with filled circles).

Figure 13:
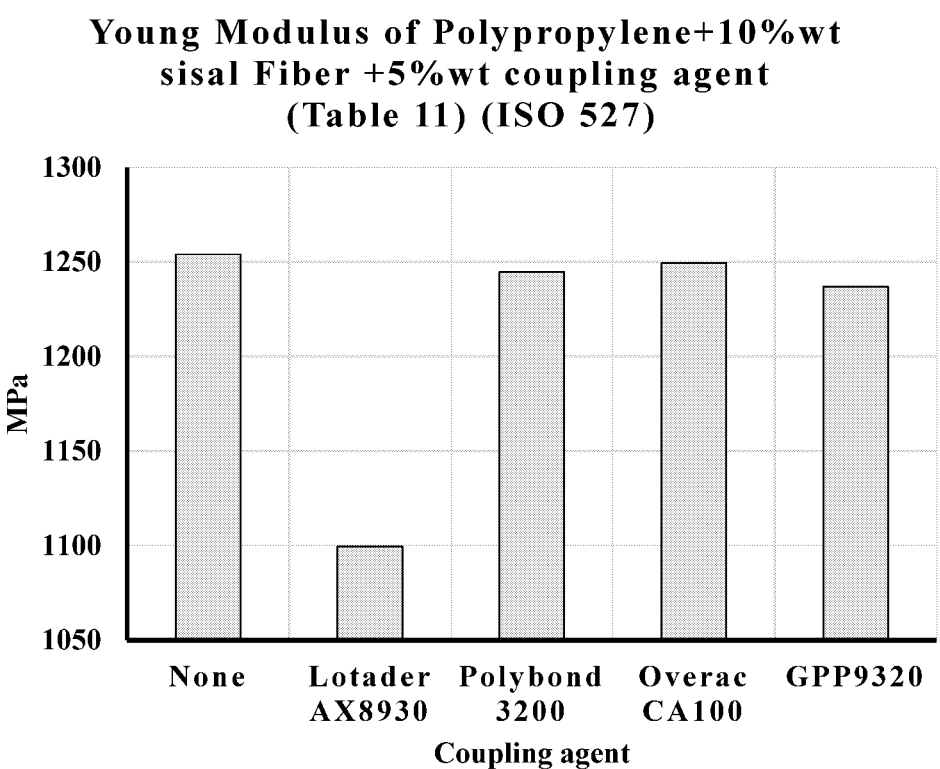
Figure 14:
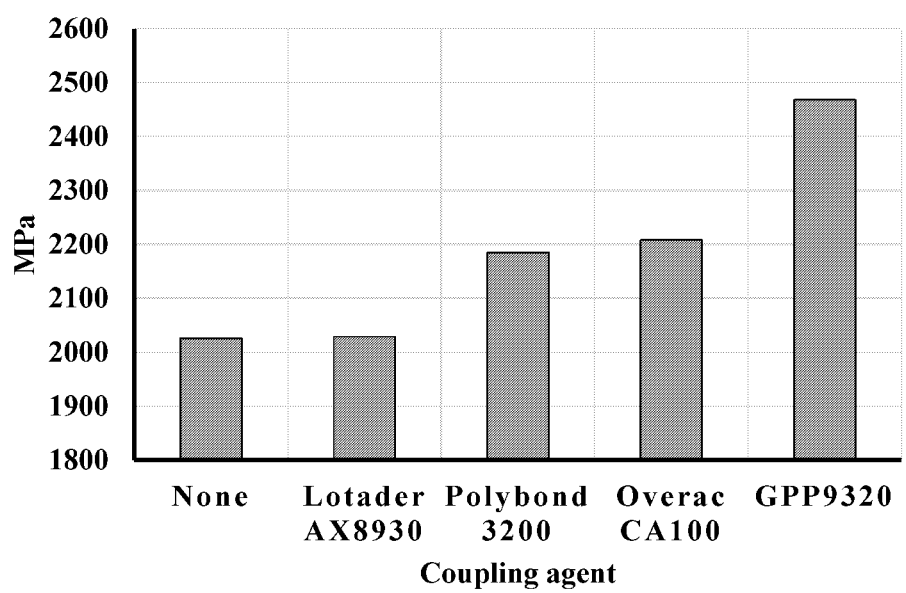

To evaluate the advantage of the grafted polyolefins described in the present invention with other commercially available coupling agents, polypropylene composites containing 10% sisal fiber and different coupling agents at 5% wt were evaluated. FIG. 13 shows that the Young modulus remains similar to the material without coupling agent in most cases, the only difference is with coupling agent Lotader AX8930, where the modulus is lower than the material without coupling agent. In the case of the flexural modulus (FIG. 14) the performance of graft copolymer from example 3.4 is considerably higher than the flexural modulus obtained with other coupling agents.

Grafted polyolefins of this invention outperform other coupling agents. This superior performance, mostly in the case of the flexural modulus, probably correlates to two advantages of the grafted polyolefins disclosed in the present

TABLE 11

Mechanical properties of polypropylene with sisal fiber

| Example No. | Sisal Fiber (% wt) | Copuling Agent (type) | Coupling Agent (% wt) | Young Modulus (Mpa) (ISO 527) | Tensile strength at yield (MPa) (ISO 527) | Elongation at yield (%) (ISO 527) | Tensile Strength at break (MPa) (ISO 527) |
|---|---|---|---|---|---|---|---|
| 11.1 | 5% | None | 0 | 1118.7 | 35.0 | 6.7 | 27.1 |
| 11.2 | 10% | None | 0 | 1253.9 | 36.5 | 5.8 | 24.3 |
| 11.3 | 20% | None* | 0 | 1363.2 | 31.4 | 4.6 | 23.7 |
| 11.4 | 5% | Example 3.4 | 5 | 1136.1 | 36.4 | 6.9 | 26.8 |
| 11.5 | 10% | Example 3.4 | 5 | 1237.0 | 37.7 | 6.1 | 29.7 |
| 11.6 | 20% | Example 3.4 | 5 | 1397.8 | 32.9 | 4.8 | 25.9 |
| 11.7 | 10% | Lotader AX8930 | 5 | 1099.5 | 31.8 | 6.6 | 23.4 |
| 11.8 | 10% | Polybond 3200 | 5 | 1244.8 | 41.7 | 6.0 | 32.4 |
| 11.9 | 10% | Overac CA100 | 5 | 1249.5 | 40.4 | 6.0 | 29.0 |

| Example No. | Elongation at break (mm)(ISO 527, 50 mm/min) | Flexural Modulus (MPa) (ISO 178) | Maximum Flexural Stress (MPa) (ISO 178,) |
|---|---|---|---|
| 11.1 | 11.3 | 1618.1 | 41.9 |
| 11.2 | 9.2 | 2025.9 | 45.6 |
| 11.3 | 6.7 | 2895.6 | 48.7 |
| 11.4 | 11.7 | 1907.2 | 48.8 |
| 11.5 | 9.5 | 2468.3 | 54.1 |
| 11.6 | 6.7 | 3271.4 | 55.8 |
| 11.7 | 11.8 | 2028.8 | 47.4 |
| 11.8 | 7.9 | 2185.0 | 58.5 |
| 11.9 | 7.9 | 2208.1 | 56.5 |

*To process these examples, Struktol TPW 104 @ 3% was added as lubricating agent.

TABLE 11 shows different composites of polypropylene and sisal fiber. Like Agave fiber, Sisal Fiber is a renewable, biodegradable filler that, properly incorporated, would proinvention. One is the lack of polymeric degradation during their synthesis, compared to the traditional reactive extrusion processes using peroxides, which generate low molecular weight coupling agent, which decrease mechanical properties of composites. The second advantage is that, since the polyolefin backbone can be chosen to be similar or equal to the polyolefin contained in the polymeric composite, the affinity/compatibility between coupling agent and matrix is guaranteed.

The amount of grafted polyolefin used in most examples is typically around 5% wt of the whole composition. Higher amounts can be used, probably up to 30% wt, but the price of the final composite would also increase. Less than 2% of the grafted polyolefin could be used but the performance is lower than with higher amounts of grafted polyolefins.

In these examples epoxy functionality is preferred in the grafted polyolefin, but other reactive groups, such as maleic anhydride could also be incorporated with good results. Both epoxy groups and maleic anhydride groups are typically used in the literature with hydroxyl containing fillers.

In one embodiment, a process to obtain a composite of a polyolefin and a filler comprises the steps of:
1) Making a grafted polyolefin by a process consisting of:
   i) making a controlled free radical polymer or copolymer using a controlled free radical polymerization process; and ii) grafting the controlled free radical polymer or copolymer to a polyolefin backbone in the presence of a CRP controlling agent.
2) Melt blending the grafted polyolefin with one or more polyolefins in the presence of one or more fillers.

In a specific embodiment the filler is a natural filler selected from the group consisting of: any plant fiber, including seed fibers: such as cotton and kapok, leaf fibers: such as abaca, date palm, pineapple, banana, and agave, bast fibers: such as flax, jute, kenaf, hemp, ramie, rattan and vine fibers, fruit fibers: such as coconut fibers, stalk fibers: such as wheat, rice, barley, bamboo, straw and soy; any animal fibers including silk, sinew, wool, catgut, angora, mohair and alpaca, animal hair such as goat hair and cashmere, fibers from birds such as feather fibers, other synthetic or natural fibers such as those containing collagen, chitin or keratin.

In a specific embodiment, the filler is added in 5% to 70% wt to the composite, preferably between 10% wt to 60% wt and most preferably between 15% wt to 50% wt.

In a specific embodiment, the grafted polyolefin contains reactive groups selected from the group consisting of: epoxy, anhydride, acid, hydroxyl, amine and amide.

In a specific embodiment, the grafted polyolefin is added in 1% to 40% wt to the composite, preferably between 3% wt to 30% wt and most preferably between 5% wt to 15% wt.

The present invention includes the following embodiments.

Embodiment 1. A process to chain extend condensation polymers, comprising mixing at least one random copolymer produced by CRP containing epoxy functional groups with at least one condensation polymer, and optionally, adding other polymers or additives such as impact modifiers.

2. A process according to embodiment 1, where the random copolymer produced by CRP contains from 5-50% weight glycidyl methacrylate.

3. A process according to embodiment 1 or 2, where the random copolymer produced by CRP has a molecular weight in number form 10,000 g/mole to 90,000 g/mole.

4. A process according to embodiment 1, 2 or 3, where the condensation polymer is selected from the group consisting of polyesters, polyamides, polycarbonates and polyurethanes.

5. A process according to embodiment 1, 2, 3 or 4, where an impact modifier is included.

6. A process according to embodiment 1, 2, 3, 4 or 5, where the other polymer or additives are selected from the group consisting of ABS, MBS and HIPS.

7. A process according to any one of embodiments 1-6, where a twin screw extruder is used for mixing.

8. A process according to any one of embodiments 1-7, where the random copolymer produced by CRP is added in a range between 0.05% wt and 10% wt.

Embodiment 9. A process for making a polyolefin or a diene polymer composite, comprising:
making a grafted polyolefin or diene polymer by first making a controlled free radical polymer or copolymer using a controlled free radical polymerization (CRP synthesized polymer) process and then grafting the CRP synthesized polymer to a polyolefin or to a diene polymer in the presence of a CRP controlling agent; and then
mixing the grafted polyolefin or diene polymer with at least one filler and at least one polyolefin, and, optionally, with additional additives.

10. A process according to embodiment 9, where the controlled free radical polymer or copolymer is made in a process, comprising the steps of:
mixing a CRP controlling agent into monomers of styrene, methyl methacrylate and glycidyl methacrylate and dissolving the CRP controlling agent in the monomers, thereby making a reaction mixture;
heating the reaction mixture to a temperature of between 30 and 90° C.;
adding an initiator to the reaction mixture;
heating the reaction mixture to a temperature between 50 and 100° C.;
reaching a conversion of between 30 and 75%, thereby forming a first-stage reaction product;
cooling the first-stage reaction product down;
transferring the first-stage reaction product to a reactor or to molds for a second-stage reaction;
heating the reactor or molds to a temperature of between 95 and 155° C.;
reaching a conversion of over 94% in the second-stage reaction, thereby making the CRP synthesized polymer, wherein the polymer is a solid material;
removing the CRP synthesized polymer from the reactor or molds;
grinding the CRP synthesized polymer; and
obtaining a solid, granular material, wherein
the CRP synthesized polymer has a number average molecular weight of between 20,000 and 100,000, wherein
the CRP synthesized polymer has a polydispersity of typically between 1.2 and 2.8, wherein the CRP synthesized polymer is a random copolymer, and wherein the CRP synthesized polymer is not a block copolymer.

11. A process according to embodiment 10, wherein the step of grafting the controlled free radical polymer or copolymer to a polyolefin or to a diene polymer in the presence of a CRP controlling agent, comprises:
mixing the CRP synthesized polymer with a polyolefin or a diene polymer or copolymer in the presence of a CRP controlling agent using reactive co-extrusion, thereby making a mixture, wherein
the CRP controlling agent is iodine, RAFT, nitroxide, alkoxyamine, alkyl halide, aryl halide or a combination of these agents, wherein
the amount of the CRP controlling agent in the mixture is between 0.05% wt and 3.5% wt, wherein
the polyolefin is polyethylene, polypropylene, an ethylene copolymer, an ethylene-propylene copolymer, an ethylene-butene copolymer, an ethylene-octene copolymer, an ethylene-vinyl acetate copolymer, a propylene copolymer, a propylene-butene copolymer, a propylene-hexene copolymer, a propylene-octene copolymer, a terpolymer or a polypropylene/ethylene-octene terpolymer or a combination the listed polyolefins, wherein the CRP synthesized polymer contains epoxy, hydroxyl, anhydride, amine, amide, carboxylic acid or carboxylate functional groups or a combination of these functional groups, and wherein the amount of the CRP synthesized polymer in a blend with the polyolefin, diene polymer or diene copolymer is between 5% wt and 55% wt.

12. A process according to embodiment 11, wherein an organic or an inorganic filler is added, and wherein the inorganic filler is preferably selected from the group comprising wollastonite, talc, glass fiber, calcium carbonate and silicates.

13. A process according to embodiment 11, wherein additional additives are added, and wherein the additional additives area selected from the group comprising impact modifiers, antioxidants, UV stabilizers, demolding additives, and lubricating additives.

14. A process according to embodiment 11, where the polyolefin is selected from the group consisting of polypropylene, polyethylene, ethylene-polyethylene copolymer, an ethylenic copolymer and a propylenic copolymer.

15. A process according to embodiment 11, wherein the step of grafting the CRP synthesized polymer to a polyolefin or to a diene polymer in the presence of a CRP controlling agent employs a twin-screw extruder.

What is claimed is:

1. A process for making a grafted polymer, comprising:
    i) making a controlled free radical polymer or copolymer using a controlled free radical polymerization (CRP) process;
    ii) adding a CRP controlling agent to the controlled free radical polymer or copolymer, wherein the CRP controlling agent is the same CRP controlling agent used to make the controlled free radical polymer or copolymer or a different CRP controlling agent; and
    iii) grafting the controlled free radical polymer or copolymer to a polyolefin in the presence of the CRP controlling agent.

2. A process according to claim 1, wherein the controlled free radical polymer or copolymer is synthesized using a CRP process or technique selected from the group consisting of RITP, RAFT, ATRP, nitroxide mediated, alkoxyamine mediated controlled free radical polymerization and iodine mediated controlled free radical polymerization.

3. A process according to claim 1, wherein the controlled free radical polymer or copolymer contains at least 30% wt of styrene.

4. A process according to claim 1, wherein the controlled free radical polymer or copolymer contains from 1 to 30% wt of glycidyl methacrylate.

5. A process according to claim 4, wherein the controlled free radical polymer or copolymer contains from 1 to 60% wt of methyl methacrylate.

6. A process according to claim 1, wherein the controlled free radical polymer or copolymer is a random polymer or a random copolymer, wherein the controlled free radical polymer or copolymer is not a block copolymer, and wherein the controlled free radical polymer or copolymer contains from 0 to 60% wt of methyl methacrylate and 0 to 50% wt of styrene and 0 to 50% wt of glycidyl methacrylate.

7. A process according to claim 1, wherein the controlled free radical polymer or copolymer contains from 0 to 60% wt of methyl methacrylate and 0 to 50% wt of styrene and 0 to 50% wt of glycidyl methacrylate.

8. A process according to claim 7, wherein the controlled free radical polymer or copolymer has a molecular weight in number between 15,000 and 120,000 g/mole.

9. A process according to claim 1, wherein the grafting step is carried out using a twin screw extruder.

10. A process according to claim 8, wherein the CRP controlling agent added after the controlled free radical polymer or copolymer is made is selected from the group consisting of iodine, RAFT, ATRP, nitroxide, alkoxyamine, alkyl halide and aryl halide.

11. A process according to claim 10, wherein the controlled free radical polymer or copolymer, the polyolefin and the CRP controlling agent comprise a blend, and wherein the amount of the CRP controlling agent in the blend is in the range of 0.01% wt to 5% wt.

12. A process according to claim 1, wherein the polyolefin is selected from the group consisting of polypropylene, polyethylene, ethylene-polyethylene copolymer, ethylene vinyl acetate, an ethylenic copolymer and a propylenic copolymer, wherein the polyolefin is not functionalized, and wherein the controlled free radical polymer or copolymer, the polyolefin and the CRP controlling agent comprise a blend, and wherein the amount of the CRP controlling agent in the blend is in the range of 0.05% wt to 3.5% wt.

13. A process according to claim 1, wherein the grafting step is carried out in a stirred reactor.

14. A process for making a grafted polymer, comprising:
    mixing a CRP controlling agent into monomers of styrene, methyl methacrylate and glycidyl methacrylate and dissolving the CRP controlling agent in the monomers, thereby making a reaction mixture;
    heating the reaction mixture to a temperature of between 30 and 90° C.;
    adding an initiator to the reaction mixture;
    heating the reaction mixture to a temperature between 50 and 100° C.;
    reaching a conversion of between 30 and 75%, thereby forming a first-stage reaction product;
    cooling the first-stage reaction product down;
    transferring the first-stage reaction product to a reactor or to molds for a second-stage reaction;
    heating the reactor or molds to a temperature of between 95 and 155° C.;
    reaching a conversion of over 94% in the second-stage reaction, thereby making a CRP synthesized polymer, wherein the CRP synthesized polymer is a solid material;
    removing the CRP synthesized polymer from the reactor or molds;
    grinding the CRP synthesized polymer; and
    obtaining a solid, granular material, wherein
    the CRP synthesized polymer has a number average molecular weight of between 20,000 and 100,000, and wherein
    the CRP synthesized polymer has a polydispersity of between 1.1 and 2.8,
    mixing the CRP synthesized polymer with a polyolefin in the presence of a CRP controlling agent using reactive co-extrusion, thereby making a mixture, wherein
    the CRP controlling agent is iodine, RAFT, nitroxide, alkoxyamine, alkyl halide, aryl halide or a combination of these agents, wherein
    the amount of the CRP controlling agent in the mixture is between 0.05% wt and 3.5% wt, wherein the polyolefin is polyethylene, polypropylene, an ethylene copolymer, an ethylene-propylene copolymer, an ethylene-butene copolymer, an ethylene-octene copolymer, an ethylene-vinyl acetate copolymer, a propylene copolymer, a propylene-butene copolymer, a propylene-hexene copolymer, a propylene-octene copolymer, a terpolymer or a polypropylene/ethylene-octene terpolymer or a combination the listed polyolefins, wherein the CRP synthesized polymer contains epoxy, hydroxyl, anhydride, amine, amide, carboxylic acid or carboxylate functional groups or a combination of these functional groups, and wherein the amount of the CRP synthesized polymer in a blend with the polyolefin is between 5% wt and 55% wt.

15. A process according to claim 14, wherein the mixing step is performed in a twin-screw extruder.

16. A process according to claim 14, wherein an organic or an inorganic filler is added, and wherein inorganic fillers include wollastonite, talc, glass fiber, calcium carbonate or silicates.

17. A process according to claim 14, wherein one or more additional additives are added, and wherein the additional additives area selected from the group consisting of impact modifiers, antioxidants, UV stabilizers, demolding additives, and lubricating additives.

18. A process for making a grafted polymer, comprising:
i) making a controlled free radical polymer or copolymer using a controlled free radical polymerization (CRP) process, and wherein the controlled free radical polymer or copolymer contains from 0 to 60% wt of methyl methacrylate and 0 to 50% wt of styrene and 0 to 50% wt of glycidyl methacrylate;
ii) adding a CRP controlling agent to the controlled free radical polymer or copolymer, wherein the CRP controlling agent is the same CRP controlling agent used to make the controlled free radical polymer or copolymer or a different CRP controlling agent; and
iii) grafting the controlled free radical polymer or copolymer to a diene polymer in the presence of the CRP controlling agent.

19. A process according to claim 18, wherein the controlled free radical polymer or copolymer, the diene polymer and the CRP controlling agent comprise a blend, and wherein the amount of the CRP controlling agent in the blend is in the range of 0.02% wt to 1.5% wt.

20. A process according to claim 19, wherein the diene polymer is selected from the group consisting of a diene rubber, a mixture of diene rubbers, a polymer of one or more conjugated 1,3-dienes, butadiene, isoprene, piperylene, chloroprene, a homopolymer of conjugated 1,3-dienes, an interpolymer of conjugated 1,3-dienes with one another, an interpolymer of one or more conjugated 1,3-dienes in isomeric forms including high cis, low cis, high vinyl, high trans, diene copolymers, polybutadiene, ABS (acrylonitrile butadiene styrene) copolymers, and butadiene-styrene copolymers.

21. A process according to claim 1, further comprising:
adding one or more polyolefins and an inorganic and/or an organic filler to the grafted polymer made according to the process of claim 1 to form a mixture; and
mixing the mixture, thereby forming a polymer composite composition, wherein the polymer composite composition comprises:
i) 50% wt to 99.49% wt of the one or more polyolefins;
ii) at least about 0.5% wt of the grafted polymer made according to the process of claim 1; and
iii) at least about 0.1% wt of the inorganic and/or the organic filler, wherein the filler may or may not be a nanofiller.

22. A process according to claim 1, further comprising:
adding one or more polyesters to the grafted polymer made according to the process of claim 1 to form a mixture; and
mixing the mixture, thereby forming a polymer composite composition, wherein the polymer composite composition comprises:
i) 80% wt to 99.5% wt of the one or more polyesters; and
ii) at least about 0.1% wt of the grafted polymer made according to the process of claim 1, wherein the polymer composite composition may or may not include an inorganic or an organic filler, and wherein the filler may or may not be a nanofiller.

23. A process according to claim 1, further comprising:
adding one or more polyolefins and/or one or more polymers bearing one or more functional groups to the grafted polymer made according to the process of claim 1 to form a mixture; and
mixing the mixture, thereby forming a polymer blend composition, wherein the polymer blend composition comprises:
i) 0.5% wt to 10% wt of the grafted polymer made according to the process of claim 1; and
ii) 90% wt to 99.5% wt of the one or more polyolefins and/or one or more polymers bearing one or more functional groups.

24. A process according to claim 23, wherein the polymer bearing functional groups is selected from the group consisting of polyesters, polycarbonates, polyurethanes, polylactic acids, lactide polymers, polyhydroxyalkanoate (PHA) polymers, polysulfones, polyacetals, polyamides, polyimides, polyether imides, polyether sulfones, polyphenylene ethers, polyether ketones, polyether-ether ketones, polyarylether ketones, polyarylates, polyphenylene sulfides and polyalkyls.

25. A process according to claim 1, further comprising:
forming the grafted polymer made according to the process of claim 1 into a film;
forming a polymer bearing functional groups into a film; and
forming layers of the grafted polymer made according to the process of claim 1 and the polymer bearing functional groups, thereby forming a multilayer polymer film composition, wherein the multilayer polymer film composition comprises:
i) one or more layers of the grafted polymer made according to the process of claim 1; and
ii) one or more layers of the polymer bearing functional groups.

26. A process according to claim 25, wherein the polymer bearing functional groups is selected from the group consisting of polyesters, polycarbonates, polyurethanes, polylactic acids, lactide polymers, polyhydroxyalkanoate (PHA) polymers, polysulfones, polyacetals, polyamides, polyimides, polyether imides, polyether sulfones, polyphenylene ethers, polyether ketones, polyether-ether ketones, polyarylether ketones, polyarylates, polyphenylene sulfides and polyalkyls.

27. A process according to claim 26, further comprising forming and adding one or more layers of a polyolefin or of a polyolefin blend to the multilayer polymer film composition of claim 26.

28. A process according to claim 26, wherein one or more of the layers contain an organic or an inorganic filler or a nanofiller.

29. A process according to claim 27, wherein one or more of the layers contain an organic or an inorganic filler or a nanofiller.

30. A process for making a grafted polymer, comprising:
mixing a controlled free radical polymerization (CRP) controlling agent into monomers of styrene, methyl methacrylate and glycidyl methacrylate, thereby making a first reaction mixture;
adding an initiator to the first reaction mixture;
heating the first reaction mixture;
forming a CRP-synthesized polymer;
adding the CRP controlling agent or a different CRP controlling agent to the CRP-synthesized polymer, thereby making a second reaction mixture;
mixing and reacting the second reaction mixture with a polyolefin, thereby making the grafted polymer.

31. A process according to claim 30, wherein the CRP controlling agent mixed into the monomers of styrene, methyl methacrylate and glycidyl methacrylate is iodine.

* * * * *